US010833874B2

(12) United States Patent
Ying et al.

(10) Patent No.: US 10,833,874 B2
(45) Date of Patent: Nov. 10, 2020

(54) CERTIFICATE NOTIFICATION METHOD AND APPARATUS

(71) Applicant: Huawei Technologies Co., Ltd., Shenzhen (CN)

(72) Inventors: Jiangwei Ying, Beijing (CN); Yanmei Yang, Beijing (CN); Jing Chen, Shanghai (CN); Qi Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 177 days.

(21) Appl. No.: 16/178,955

(22) Filed: Nov. 2, 2018

(65) Prior Publication Data

US 2019/0081802 A1 Mar. 14, 2019

Related U.S. Application Data

(63) Continuation of application No. PCT/CN2016/080928, filed on May 3, 2016.

(51) Int. Cl.
*H04L 29/06* (2006.01)
*H04L 9/32* (2006.01)
(Continued)

(52) U.S. Cl.
CPC .............. *H04L 9/3268* (2013.01); *H04L 9/30* (2013.01); *H04L 9/3247* (2013.01);
(Continued)

(58) Field of Classification Search
CPC ... G06F 21/33; H04L 9/3268; H04L 2209/84; H04L 63/062
(Continued)

(56) References Cited

U.S. PATENT DOCUMENTS 8,090,949 B2 * 1/2012 Bellur .................. H04L 9/3268
700/200
10,050,793 B2 * 8/2018 Foerster ............... H04L 9/3066
(Continued)

FOREIGN PATENT DOCUMENTS

CN 1980474 A 6/2007
CN 101378582 A 3/2009
(Continued)

OTHER PUBLICATIONS

Kiening et al, Trust Assurance Levels of Cybercars in V2X Communication, ACM, Nov. 4, 2013, pp. 49-60.*
(Continued)

*Primary Examiner* — Alexander Lagor
*Assistant Examiner* — Jenise E Jackson
(74) *Attorney, Agent, or Firm* — Slater Matsil, LLP

(57) ABSTRACT

A certificate notification method, including reporting a certificate of a first terminal to a server, obtaining public key maintenance information including a public key corresponding to a certificate of each of one or more terminals within a preset area range and certificate identification information corresponding to the certificate of the corresponding terminal, receiving a communication message including certificate identification information corresponding to a certificate of the second terminal and a signature generated by the second terminal, determining, according to certificate identification information and the public key maintenance information, a public key corresponding to the certificate of the second terminal, and verifying, according to the public key corresponding to the certificate of the second terminal, the signature generated by the second terminal.

16 Claims, 15 Drawing Sheets

(51) Int. Cl.
*H04W 12/06* (2009.01)
*H04L 9/30* (2006.01)

(52) U.S. Cl.
CPC ........ *H04L 9/3263* (2013.01); *H04L 63/0823* (2013.01); *H04W 12/0609* (2019.01); *H04L 2209/80* (2013.01); *H04L 2209/84* (2013.01)

(58) Field of Classification Search
USPC .......................................................... 713/156
See application file for complete search history.

(56) References Cited

U.S. PATENT DOCUMENTS

| | | | | |
|---|---|---|---|---|
| 10,484,351 | B2* | 11/2019 | Romansky | H04L 63/06 |
| 2007/0087751 | A1 | 4/2007 | Voyer et al. | |
| 2008/0301439 | A1 | 12/2008 | Hashimoto et al. | |
| 2009/0259841 | A1* | 10/2009 | Laberteaux | H04L 63/0823 |
| | | | | 713/156 |
| 2011/0083011 | A1* | 4/2011 | DiCrescenzo | H04L 9/0891 |
| | | | | 713/158 |
| 2011/0320802 | A1 | 12/2011 | Wang et al. | |
| 2013/0305043 | A1* | 11/2013 | Zhang | H04W 12/1207 |
| | | | | 713/158 |
| 2015/0052352 | A1* | 2/2015 | Dolev | H04W 12/003 |
| | | | | 713/156 |
| 2015/0156025 | A1 | 6/2015 | Zhu et al. | |
| 2015/0318997 | A1 | 11/2015 | Kobayashi et al. | |

FOREIGN PATENT DOCUMENTS

| | | |
|---|---|---|
| CN | 101616006 A | 12/2009 |
| CN | 101860824 A | 10/2010 |
| CN | 102299797 A | 12/2011 |
| CN | 102801616 A | 11/2012 |
| CN | 104301113 A | 1/2015 |
| CN | 104469763 A | 3/2015 |
| CN | 105427643 A | 3/2016 |

OTHER PUBLICATIONS

Signoria et al, V2X Demonstration, IEEE, 2014, pp. 1-3.*
Bellur, B. et al., "TESLA Authentication and Digital Signatures for V2X Messages," www.ip.com, IP.com No. IPCOM000175320D, IP.com Electronic Publication, XP013126495, Oct. 9, 2008, 10 pages.
Kenney, J.B., "Dedicated Short-Range Communications (DSRC) Standards in the United States," Proceedings of the IEEE, vol. 99, No. 7, Jul. 2011, 22 pages.

* cited by examiner

| Header | Message body | Certificate | Signature |

CERTIFICATE NOTIFICATION METHOD AND APPARATUS

CROSS-REFERENCE TO RELATED APPLICATIONS

This application is a continuation of International Application No. PCT/CN2016/080928, filed on May 3, 2016, the disclosure of which is hereby incorporated by reference in its entirety.

TECHNICAL FIELD

The present disclosure relates to the field of communications technologies, and in particular, to a certificate notification method and apparatus.

BACKGROUND

In recent years, the Internet of Vehicles attracts more attention of people, and road traffic safety, reliability, and transportation efficiency are improved through vehicle-to-vehicle communication or vehicle-to-infrastructure communication. Therefore, an intelligent transportation system aims to implement continuous vehicle-to-vehicle, vehicle-to-pedestrian, or vehicle-to-infrastructure communication, to exchange a current vehicle status or a surrounding environment status, reduce traffic accidents, improve transportation safety, help alleviate traffic congestion, reduce energy consumption, reduce pollution emissions, protect the environment, improve transportation efficiency, and prompt development of related industries.

In a typical Internet of Vehicles system, based on transmission between vehicles, to be specific, periodic exchange of data such as locations, speeds, and steering between the vehicles, a vehicle can sense a surrounding vehicle, and a function of helping a driver in safe driving is implemented by using these pieces of information. The typical Internet of Vehicles system is easy in deployment, low in costs, and mature in technologies, but also has the following disadvantages. When there are many vehicles in the system, neighboring vehicles may select a same resource for data transmission. Consequently, it is prone to a resource collision, system performance is relatively poor, quality of service (QoS) cannot be ensured, and a transmission distance is also limited. In addition, a large quantity of road side units (RSU) need to be deployed in the system, leading to excessively high costs.

In addition, security of vehicle-to-vehicle (V2V) communication depends on a public key infrastructure (PKI) based certificate system, and V2V messages transmitted between vehicles all need to carry a certificate and a signature, causing very high transmission overheads.

Referring to FIG. 1, a format of a V2V message is as follows, where a certificate and a signature need to be carried.

Referring to FIG. 2, a $3^{rd}$ generation partnership project (3GPP) long term evolution (LTE) technology has such advantages as a high rate, a low delay, large coverage, and supporting a high-speed mobile terminal, and is applicable to V2V communications in which dynamic scheduling is implemented, by using a central scheduler, for example, an evolved NodeB (eNB), on a transmission resource required for data transmission between vehicles, thereby improving system performance.

However, in such an Internet of Vehicles system, current ITS security schemes in Europe and the United States are still used to implement security of vehicle-to-vehicle communication, and communication between a vehicle and another device (to be specific, by using certificates based on asymmetric keys), and each message between an LTE based vehicle and another communications device that is, an LTE-V2X message needs to carry a certificate and a signature. For example, a vehicle 1 communicates with a vehicle 2, and the vehicle 1 sends a first message to the vehicle 2. In this case, the first message needs to carry a certificate of the vehicle 1 and a signature generated by the vehicle 1 for the first message. The signature is generated based on a private key of the vehicle 1. After receiving the first message, the vehicle 2 derives a public key of the vehicle 1 based on the certificate of the vehicle 1, and then verifies the signature by using the public key of the vehicle 1. After the verification succeeds, the vehicle 2 parses other content carried in the first message.

In each LTE-V2X message, transmission overheads occupied by a certificate and a signature account for a very large proportion of transmission overheads of the LTE-V2X message. Therefore, transmission overheads occupied by a certificate and a signature that are used for security assurance are relatively high. Even if a certificate is periodically carried by using an existing optimization technology to reduce transmission overheads, for an LTE-V2X message, security overheads still seem to be excessively high, and a capacity requirement on LTE-V2X communication cannot be met. To ensure vehicle security, a vehicle-to-vehicle communication message needs to meet a relatively high sending frequency (for example, 10 Hz), and a capacity requirement that one eNB should cover a particular quantity of vehicles needs to be met. However, due to limited air interface resources (for example, 10 M) that can be used by the vehicle-to-vehicle communication message, an existing technical solution cannot meet the foregoing requirement of the Internet of Vehicles.

SUMMARY

Embodiments of the present disclosure provide a certificate notification method and apparatus, to reduce transmission overheads occupied by a certificate and a signature that are used for security assurance, and meet, to a greatest extent, a capacity requirement of an Internet of Vehicles system implemented based on an LTE technology on vehicle-to-vehicle communication.

Specific technical solutions provided in the embodiments of the present disclosure are as follows.

According to a first aspect, a certificate notification method includes reporting, by a first terminal, a certificate of the first terminal to a server, and obtaining public key maintenance information from the server, where the public key maintenance information includes a public key corresponding to a certificate of each terminal within a preset area range and certificate identification information corresponding to the certificate of the corresponding terminal, receiving, by the first terminal, communication information sent by a second terminal, where the communication information includes certificate identification information corresponding to a certificate of the second terminal and a signature generated by the second terminal for the communication message, and the signature generated by the second terminal for the communication message is generated by the second terminal after the second terminal performs signature calculation on the communication message by using a private key corresponding to the certificate of the second terminal, determining, by the first terminal based on the certificate identification information corresponding to the certificate of the second terminal and the public key maintenance information, a public key corresponding to the certificate of the second terminal, and verifying, by the first terminal based on the public key corresponding to the certificate of the second terminal, the signature generated by the second terminal for the communication message.

Therefore, according to the method provided in an embodiment of the present disclosure, a terminal obtains public key maintenance information in advance, so that during communication with another terminal, a certificate of the terminal no longer needs to be carried, thereby greatly reducing transmission overheads.

Optionally, the certificate identification information is a combination of the following at least one piece of information that may include a certificate issuer name and a certificate serial number, or a certificate name, or a certificate unique identifier.

Therefore, in this embodiment of the present disclosure, the certificate identification information may be a flexible combination of a plurality of types of messages.

Optionally, the reporting, by a first terminal, a certificate of the first terminal to a server includes, when obtaining geographical location information of the first terminal, reporting, by the first terminal, the geographical location information and the certificate of the first terminal to the server, or when detecting a new cell global identifier ECGI, reporting, by the first terminal, the new ECGI and the certificate of the first terminal to the server, or when detecting a new tracking area code TAC, reporting, by the first terminal, the new TAC and the certificate of the first terminal to the server.

Therefore, there may be a plurality of possible conditions for triggering the terminal to perform certificate reporting, thereby ensuring that the public key maintenance information can be updated in time.

Optionally, the reporting, by a first terminal, a certificate of the first terminal to a server includes obtaining, by the first terminal, area configuration information, where the area configuration information is a division result obtained by performing area division in a unit of at least one base station, or in a unit of at least one TA, or based on a geographical area, and each area corresponds to one area identifier, and when determining, based on the area configuration information, that an area in which the first terminal is located is changed, sending, by the first terminal to the server, the certificate of the first terminal and an area identifier of the area to which the first terminal belongs.

Therefore, when the terminal determines that an area in which the terminal is located is changed, certificate reporting can be triggered in time, thereby ensuring that the public key maintenance information can be updated in time.

Optionally, the determining, by the first terminal based on the area configuration information, that an area in which the first terminal is located is changed includes when obtaining geographical location information of the first terminal, determining, by the first terminal based on the geographical location information and the area configuration information, that the area to which the first terminal belongs is changed, or when detecting a new ECGI, determining, by the first terminal based on the new ECGI and the area configuration information, that the area to which the first terminal belongs is changed, or when detecting a new TAC, determining, by the first terminal based on the new tracking area code TAC and the area configuration information, that the area to which the first terminal belongs is changed.

Therefore, the terminal can determine, in a plurality of manners, that the area in which the terminal is located is changed.

Optionally, the reporting, by a first terminal, a certificate of the first terminal to a server includes determining, by the first terminal, a certificate that needs to be used after the certificate is updated, and reporting, to the server, the certificate that needs to be used after the update.

Optionally, the obtaining, by the first terminal, public key maintenance information from the server includes receiving, by the first terminal, the public key maintenance information sent by the server, or receiving, by the first terminal, a public key maintenance message corresponding to the area identifier of the area to which the first terminal belongs and the area identifier of the area to which the first terminal belongs, where the public key maintenance message and the area identifier are sent by the server.

Therefore, the terminal can obtain a plurality of forms of public key maintenance information in a plurality of manners.

Optionally, the obtaining, by the first terminal, public key maintenance information from the server includes receiving, by the first terminal, the public key maintenance message broadcast by the server, or receiving, by the first terminal, a public key maintenance message corresponding to the area identifier of the area to which the first terminal belongs and the area identifier of the area to which the first terminal belongs, where the public key maintenance message and the area identifier are broadcast by the server.

Therefore, the terminal can obtain a plurality of forms of public key maintenance information in a plurality of manners.

Optionally, after the obtaining, by the first terminal, public key maintenance information, the method includes receiving, by the first terminal, a public key maintenance update message, where the public key maintenance update message is used to update public key maintenance information currently stored by the first terminal, and updating, by the first terminal, the currently stored public key maintenance information based on the public key maintenance update message.

Therefore, the terminal can update, in time, public key maintenance information stored by the terminal, thereby ensuring smooth communication with the another terminal.

Optionally, the public key maintenance update message carries a combination of the following at least one piece of information that may be newest public key maintenance information, or at least one area identifier and a newest public key maintenance message corresponding to the corresponding area identifier, or a public key corresponding to a certificate of a terminal for which a public key in the public key maintenance information is updated within preset duration and certificate identification information corresponding to the certificate of the corresponding terminal, and a public key corresponding to a certificate of a newly added terminal and certificate identification information corresponding to the certificate of the corresponding terminal, or a public key corresponding to a certificate of a terminal for which a public key in public key maintenance information corresponding to each area identifier is updated within preset duration and certificate identification information corresponding to the certificate of the corresponding terminal, a public key corresponding to a certificate of a newly added terminal and certificate identification information corresponding to the certificate of the corresponding terminal, and a corresponding area identifier.

Therefore, the public key maintenance update message may be flexibly combined in a plurality of manners, and broadcast to each terminal.

According to a second aspect, a certificate notification method includes receiving, by a server, a certificate of a corresponding terminal that is reported by at least one terminal, updating, by the server, public key maintenance information based on a public key corresponding to a certificate of each of the at least one terminal and certificate identification information corresponding to the certificate of the corresponding terminal, where the public key maintenance information includes a public key corresponding to a certificate of each terminal within a preset area range and certificate identification information corresponding to the certificate of the corresponding terminal, and notifying, by the server, the at least one terminal of the public key maintenance information.

Therefore, according to the method provided in an embodiment of the present disclosure, the server obtains the certificate of each terminal, and updates the public key maintenance information based on the reported certificate and notifies each terminal of the public key maintenance information, so that each terminal can obtain the public key maintenance information, thereby ensuring communication between the terminals, and effectively reducing transmission overheads for communication between the terminals.

Optionally, the certificate identification information is a combination of the following at least one piece of information a certificate issuer name and a certificate serial number, or a certificate name, or a certificate unique identifier.

Optionally, the updating, by the server, public key maintenance information based on a public key corresponding to a certificate of each of the at least one terminal and certificate identification information corresponding to the certificate of the corresponding terminal includes when determining that an area to which a first terminal belongs is changed, updating, by the server based on a public key corresponding to a certificate of the first terminal and certificate identification information corresponding to the certificate of the first terminal, public key maintenance information corresponding to an area identifier of the area to which the first terminal belongs, or updating public key maintenance information corresponding to an area identifier of the area to which the first terminal belongs and public key maintenance information corresponding to an area identifier of at least one neighboring area of the area to which the first terminal belongs, where the first terminal is any one of the at least one terminal.

Therefore, the server updates public key maintenance information corresponding to an area in which a terminal is located, and can further update public key maintenance information corresponding to each neighboring area of the area, thereby effectively ensuring smooth communication on an edge of an area of each terminal.

Optionally, the determining, by the server, that an area to which the first terminal belongs is changed includes receiving, by the server, the area identifier that is reported by the first terminal and that is of the area to which the first terminal belongs, or obtaining, by the server, area configuration information, and determining, based on geographical location information reported by the first terminal and the area configuration information, that the area to which the first terminal belongs is changed, or obtaining, by the server, area configuration information, and determining, based on an ECGI reported by the first terminal and the area configuration information, that the area to which the first terminal belongs is changed, or obtaining, by the server, area configuration information, and determining, based on a TAC reported by the first terminal and the area configuration information, that the area to which the first terminal belongs is changed, where the area configuration information is a division result obtained by performing area division in a unit of at least one base station, or in a unit of at least one TA, or based on a geographical area, and each area corresponds to one area identifier.

Therefore, the server can determine, based on various types of information reported by the terminal, whether the area in which the terminal is located is changed.

Optionally, the updating, by the server, public key maintenance information based on a public key corresponding to a certificate of each of the at least one terminal and certificate identification information corresponding to the certificate of the corresponding terminal includes, if determining that first public key maintenance information included in a to-be-analyzed public key maintenance information set times out and a public key corresponding to a certificate of a second terminal and certificate identification information corresponding to the certificate of the second terminal are not updated, deleting, by the server from the first public key maintenance information, the public key corresponding to the certificate of the second terminal and the certificate identification information corresponding to the certificate of the second terminal, where the to-be-analyzed public key maintenance information set includes at least one piece of public key maintenance information that stores the public key corresponding to the certificate of the second terminal and the certificate identification information corresponding to the certificate of the second terminal, the first public key maintenance information is any piece of public key maintenance information in the to-be-analyzed public key maintenance information set, and the second terminal is any one of the at least one terminal.

Therefore, the server can delete, from the public key maintenance information, information that does not need to be stored, thereby reducing transmission overheads for transmitting the public key maintenance information, and ensuring validity of the public key maintenance information.

Optionally, the updating, by the server, public key maintenance information based on a public key corresponding to a certificate of each of the at least one terminal and certificate identification information corresponding to the certificate of the corresponding terminal includes, when determining that a third terminal moves from a first area to a second area, determining, by the server, a first neighboring area set and a second neighboring area set that respectively correspond to the first area and the second area, where the first neighboring area set includes an area identifier of at least one neighboring area of the first area, and the second neighboring area set includes an area identifier of at least one neighboring area of the second area, determining, by the server, an intersection set of the first neighboring area set and the second neighboring area set, and a to-be-cleaned set, where the to-be-cleaned set includes an area identifier included in the first neighboring area but not included in the intersection set, and deleting, by the server from public key maintenance information corresponding to each area identifier in the to-be-cleaned set, a public key corresponding to a certificate of the third terminal and certificate identification information corresponding to the certificate of the third terminal, where the second terminal is any one of the at least one terminal.

Therefore, the server can delete, from the public key maintenance information, information that does not need to be stored, thereby reducing transmission overheads for transmitting the public key maintenance information, and ensuring validity of the public key maintenance information.

Optionally, the notifying, by the server, the at least one terminal of the public key maintenance information includes sending, by the server, the public key maintenance information to each of the at least one terminal, or sending, by the server to the corresponding terminal, public key maintenance information corresponding to an area identifier of an area to which each of the at least one terminal belongs and the area identifier of the area to which the corresponding terminal belongs.

Therefore, the server can notify each terminal of a plurality of forms of public key maintenance information in a plurality of manners.

Optionally, the notifying, by the server, the at least one terminal of the public key maintenance information includes broadcasting, by the server, the public key maintenance message, or broadcasting, by the server, at least one area identifier and a public key maintenance message corresponding to the corresponding area identifier.

Therefore, the server can notify each terminal of a plurality of forms of public key maintenance information in a plurality of manners.

Optionally, after the notifying, by the server, the at least one terminal of the public key maintenance information, the method further includes determining and broadcasting, by the server, a public key maintenance update message, where the public key maintenance update message is used to update public key maintenance information currently stored by each of the at least one terminal.

Optionally, the public key maintenance update message carries a combination of the following at least one piece of information that may be newest public key maintenance information, or at least one area identifier and a newest public key maintenance message corresponding to the corresponding area identifier, or a public key corresponding to a certificate of a terminal for which a public key in the public key maintenance information is updated within preset duration and certificate identification information corresponding to the certificate of the corresponding terminal, and a public key corresponding to a certificate of a newly added terminal and certificate identification information corresponding to the certificate of the corresponding terminal, or a public key corresponding to a certificate of a terminal for which a public key in public key maintenance information corresponding to each area identifier is updated within preset duration and certificate identification information corresponding to the certificate of the corresponding terminal, a public key corresponding to a certificate of a newly added terminal and certificate identification information corresponding to the certificate of the corresponding terminal, and a corresponding area identifier.

According to a third aspect, a certificate notification apparatus includes a reporting unit, configured to report a certificate of the first terminal to a server, an obtaining unit, configured to obtain public key maintenance information from the server, where the public key maintenance information includes a public key corresponding to a certificate of each terminal within a preset area range and certificate identification information corresponding to the certificate of the corresponding terminal, a receiving unit, configured to receive communication information sent by a second terminal, where the communication information includes certificate identification information corresponding to a certificate of the second terminal and a signature generated by the second terminal for the communication message, and the signature generated by the second terminal for the communication message is generated by the second terminal after the second terminal performs signature calculation on the communication message by using a private key corresponding to the certificate of the second terminal, an analysis unit, configured to determine, based on the certificate identification information corresponding to the certificate of the second terminal and the public key maintenance information, a public key corresponding to the certificate of the second terminal, and a verification unit, configured to verify, based on the public key corresponding to the certificate of the second terminal, the signature generated by the second terminal for the communication message.

Optionally, the certificate identification information is a combination of the following at least one piece of information that may be a certificate issuer name and a certificate serial number, or a certificate name, or a certificate unique identifier.

Optionally, when reporting the certificate of the first terminal to the server, the reporting unit is configured to, when the first terminal obtains geographical location information of the first terminal, report the geographical location information and the certificate of the first terminal to the server, or when the first terminal detects a new cell global identifier ECGI, report the new ECGI and the certificate of the first terminal to the server, or when the first terminal detects a new tracking area code TAC, report the new TAC and the certificate of the first terminal to the server.

Optionally, when reporting the certificate of the first terminal to the server, the reporting unit is configured to obtain area configuration information, where the area configuration information is a division result obtained by performing area division in a unit of at least one base station, or in a unit of at least one TA, or based on a geographical area, and each area corresponds to one area identifier, and when determining, based on the area configuration information, that an area in which the first terminal is located is changed, send, to the server, the certificate of the first terminal and an area identifier of the area to which the first terminal belongs.

Optionally, when determining, based on the area configuration information, that the area in which the first terminal is located is changed, the reporting unit is further configured to when geographical location information of the first terminal is obtained, determine, based on the geographical location information and the area configuration information, that the area to which the first terminal belongs is changed, or when a new ECGI is detected, determine, based on the new ECGI and the area configuration information, that the area to which the first terminal belongs is changed, or when a new TAC is detected, determine, based on the new tracking area code TAC and the area configuration information, that the area to which the first terminal belongs is changed.

Optionally, when reporting the certificate of the first terminal to the server, the reporting unit is configured to determine a certificate that needs to be used after the certificate is updated, and report, to the server, the certificate that needs to be used after the update.

Optionally, when obtaining the public key maintenance information from the server, the obtaining unit is configured to receive the public key maintenance information sent by the server, or receive a public key maintenance message corresponding to the area identifier of the area to which the first terminal belongs and the area identifier of the area to which the first terminal belongs, where the public key maintenance message and the area identifier are sent by the server.

Optionally, when obtaining the public key maintenance information from the server, the obtaining unit is configured to receive the public key maintenance message broadcast by the server, or receive a public key maintenance message corresponding to the area identifier of the area to which the first terminal belongs and the area identifier of the area to which the first terminal belongs, where the public key maintenance message and the area identifier are broadcast by the server.

Optionally, after the public key maintenance information is obtained, the receiving unit is further configured to receive, by the first terminal, a public key maintenance update message, where the public key maintenance update message is used to update public key maintenance information currently stored by the first terminal, and the apparatus further includes an update unit, configured to update, based on the public key maintenance update message, the currently stored public key maintenance information.

Optionally, the public key maintenance update message carries a combination of the following at least one piece of information that may include newest public key maintenance information, or at least one area identifier and a newest public key maintenance message corresponding to the corresponding area identifier, or a public key corresponding to a certificate of a terminal for which a public key in the public key maintenance information is updated within preset duration and certificate identification information corresponding to the certificate of the corresponding terminal, and a public key corresponding to a certificate of a newly added terminal and certificate identification information corresponding to the certificate of the corresponding terminal, or a public key corresponding to a certificate of a terminal for which a public key in public key maintenance information corresponding to each area identifier is updated within preset duration and certificate identification information corresponding to the certificate of the corresponding terminal, a public key corresponding to a certificate of a newly added terminal and certificate identification information corresponding to the certificate of the corresponding terminal, and a corresponding area identifier.

According to a fourth aspect, a certificate notification apparatus includes a receiving unit, configured to receive a certificate of a corresponding terminal that is reported by at least one terminal, a maintenance unit, configured to update public key maintenance information based on a public key corresponding to a certificate of each of the at least one terminal and certificate identification information corresponding to the certificate of the corresponding terminal, where the public key maintenance information includes a public key corresponding to a certificate of each terminal within a preset area range and certificate identification information corresponding to the certificate of the corresponding terminal, and a sending unit, configured to notify the at least one terminal of the public key maintenance information.

Optionally, the certificate identification information is a combination of the following at least one piece of information that may include a certificate issuer name and a certificate serial number, or a certificate name, or a certificate unique identifier.

Optionally, when updating the public key maintenance information based on the public key corresponding to the certificate of each of the at least one terminal and the certificate identification information corresponding to the certificate of the corresponding terminal, the maintenance unit is configured to, when determining that an area to which a first terminal belongs is changed, update, based on a public key corresponding to a certificate of the first terminal and certificate identification information corresponding to the certificate of the first terminal, public key maintenance information corresponding to an area identifier of the area to which the first terminal belongs, or update public key maintenance information corresponding to an area identifier of the area to which the first terminal belongs and public key maintenance information corresponding to an area identifier of at least one neighboring area of the area to which the first terminal belongs, where the first terminal is any one of the at least one terminal.

Optionally, when determining that the area to which the first terminal belongs is changed, the maintenance unit is further configured to receive the area identifier that is reported by the first terminal and that is of the area to which the first terminal belongs, or obtain area configuration information, and determine, based on geographical location information reported by the first terminal and the area configuration information, that the area to which the first terminal belongs is changed, or obtain area configuration information, and determine, based on an ECGI reported by the first terminal and the area configuration information, that the area to which the first terminal belongs is changed, or obtain area configuration information, and determine, based on a TAC reported by the first terminal and the area configuration information, that the area to which the first terminal belongs is changed, where the area configuration information is a division result obtained by performing area division in a unit of at least one base station, or in a unit of at least one TA, or based on a geographical area, and each area corresponds to one area identifier.

Optionally, when updating the public key maintenance information based on the public key corresponding to the certificate of each of the at least one terminal and the certificate identification information corresponding to the certificate of the corresponding terminal, the maintenance unit is further configured to: if determining that first public key maintenance information included in a to-be-analyzed public key maintenance information set times out and a public key corresponding to a certificate of a second terminal and certificate identification information corresponding to the certificate of the second terminal are not updated, delete, by the server from the first public key maintenance information, the public key corresponding to the certificate of the second terminal and the certificate identification information corresponding to the certificate of the second terminal, where the to-be-analyzed public key maintenance information set includes at least one piece of public key maintenance information that stores the public key corresponding to the certificate of the second terminal and the certificate identification information corresponding to the certificate of the second terminal, the first public key maintenance information is any piece of public key maintenance information in the to-be-analyzed public key maintenance information set, and the second terminal is any one of the at least one terminal.

Optionally, when updating the public key maintenance information based on the public key corresponding to the certificate of each of the at least one terminal and the certificate identification information corresponding to the certificate of the corresponding terminal, the maintenance unit is further configured to, when determining that a third terminal moves from a first area to a second area, determine a first neighboring area set and a second neighboring area set that respectively correspond to the first area and the second area, where the first neighboring area set includes an area identifier of at least one neighboring area of the first area, and the second neighboring area set includes an area identifier of at least one neighboring area of the second area, determine an intersection set of the first neighboring area set and the second neighboring area set, and a to-be-cleaned set, where the to-be-cleaned set includes an area identifier included in the first neighboring area but not included in the intersection set, and delete, from public key maintenance information corresponding to each area identifier in the to-be-cleaned set, a public key corresponding to a certificate of the third terminal and certificate identification information corresponding to the certificate of the third terminal, where the second terminal is any one of the at least one terminal.

Optionally, when notifying the at least one terminal of the public key maintenance information, the sending unit is configured to send the public key maintenance information to each of the at least one terminal, or send, to the corresponding terminal, public key maintenance information corresponding to an area identifier of an area to which each of the at least one terminal belongs and the area identifier of the area to which the corresponding terminal belongs.

Optionally, when notifying the at least one terminal of the public key maintenance information, the sending unit is configured to broadcast the public key maintenance message, or broadcast at least one area identifier and a public key maintenance message corresponding to the corresponding area identifier.

Optionally, after notifying the at least one terminal of the public key maintenance information, the sending unit is further configured to determine and broadcast a public key maintenance update message, where the public key maintenance update message is used to update public key maintenance information currently stored by each of the at least one terminal.

Optionally, the public key maintenance update message carries a combination of the following at least one piece of information that may include newest public key maintenance information, or at least one area identifier and a newest public key maintenance message corresponding to the corresponding area identifier, or a public key corresponding to a certificate of a terminal for which a public key in the public key maintenance information is updated within preset duration and certificate identification information corresponding to the certificate of the corresponding terminal, and a public key corresponding to a certificate of a newly added terminal and certificate identification information corresponding to the certificate of the corresponding terminal, or a public key corresponding to a certificate of a terminal for which a public key in public key maintenance information corresponding to each area identifier is updated within preset duration and certificate identification information corresponding to the certificate of the corresponding terminal, a public key corresponding to a certificate of a newly added terminal and certificate identification information corresponding to the certificate of the corresponding terminal, and a corresponding area identifier.

According to a fifth aspect, an embodiment of the present disclosure provides a terminal, including a transceiver, a processor, and a memory. The transceiver, the processor, and the memory are connected by using a bus. The transceiver is configured to report a certificate of a first terminal to a server, and obtain public key maintenance information from the server, and receive communication information sent by a second terminal, where the communication information includes certificate identification information corresponding to a certificate of the second terminal and a signature generated by the second terminal for the communication message, and the signature generated by the second terminal for the communication message is generated by the second terminal after the second terminal performs signature calculation on the communication message by using a private key corresponding to the certificate of the second terminal. The memory is configured to store program code executable by the processor. The processor is configured to perform the following operations by using the program code in the memory, including determining, based on the certificate identification information corresponding to the certificate of the second terminal and the public key maintenance information, a public key corresponding to the certificate of the second terminal, and verifying, based on the public key corresponding to the certificate of the second terminal, the signature generated by the second terminal for the communication message.

According to a sixth aspect, an embodiment of the present disclosure provides a server, including a transceiver, a processor, and a memory. The transceiver, the processor, and the memory are connected by using a bus. The transceiver is configured to receive a certificate of a corresponding terminal that is reported by at least one terminal, and notify the at least one terminal of public key maintenance information. The memory is configured to store program code executable by the processor. The processor is configured to perform the following operations by using the program code in the memory, including updating public key maintenance information based on a public key corresponding to a certificate of each of the at least one terminal and certificate identification information corresponding to the certificate of the corresponding terminal, where the public key maintenance information includes a public key corresponding to a certificate of each terminal within a preset area range and certificate identification information corresponding to the certificate of the corresponding terminal.

According to the embodiments of the present disclosure, the certificate of the first terminal is reported to the server, and the public key maintenance information is obtained from the server, so that before communicating with another terminal, the first terminal obtains the public key maintenance information in time, the first terminal receives the communication information sent by the second terminal, where the communication information includes the certificate identification information corresponding to the certificate of the second terminal and the signature generated by the second terminal for the communication message, in this case, the communication message no longer needs to carry the certificate of the first terminal, thereby greatly reducing transmission overheads, the first terminal determines, based on the certificate identification information corresponding to the certificate of the second terminal and the public key maintenance information, the public key corresponding to the certificate of the second terminal, and the first terminal verifies, based on the public key corresponding to the certificate of the second terminal, the signature generated by the second terminal for the communication message. The server receives the certificate of the corresponding terminal that is reported by the at least one terminal, and the server updates the public key maintenance information based on the public key corresponding to the certificate of each of the at least one terminal and the certificate identification information corresponding to the certificate of the corresponding terminal, and the server notifies the at least one terminal of the public key maintenance information, so that each terminal can obtain the public key maintenance information, thereby ensuring communication between the terminals, and effectively reducing transmission overheads for communication between the terminals.

BRIEF DESCRIPTION OF THE DRAWINGS

FIG. 1 is a schematic diagram of a format of a V2V message in the Background of the present disclosure;

FIG. 5 is a schematic structural diagram of division of an area in which a terminal is located according to an embodiment of the present disclosure;

DETAILED DESCRIPTION OF ILLUSTRATIVE EMBODIMENTS

Embodiments of the present disclosure provide a certificate notification method and apparatus, to reduce transmission overheads occupied by a certificate and a signature that are used for security assurance, and meet, to a greatest extent, a capacity requirement of an Internet of Vehicles system implemented based on an LTE technology on vehicle-to-vehicle communication.

The method and the apparatus are conceived based on a same disclosure. The method and the apparatus have similar principles for resolving the problems. Therefore, for implementation of the apparatus and the method, refer to each other, and details of repeated parts are not described.

Figure 2:
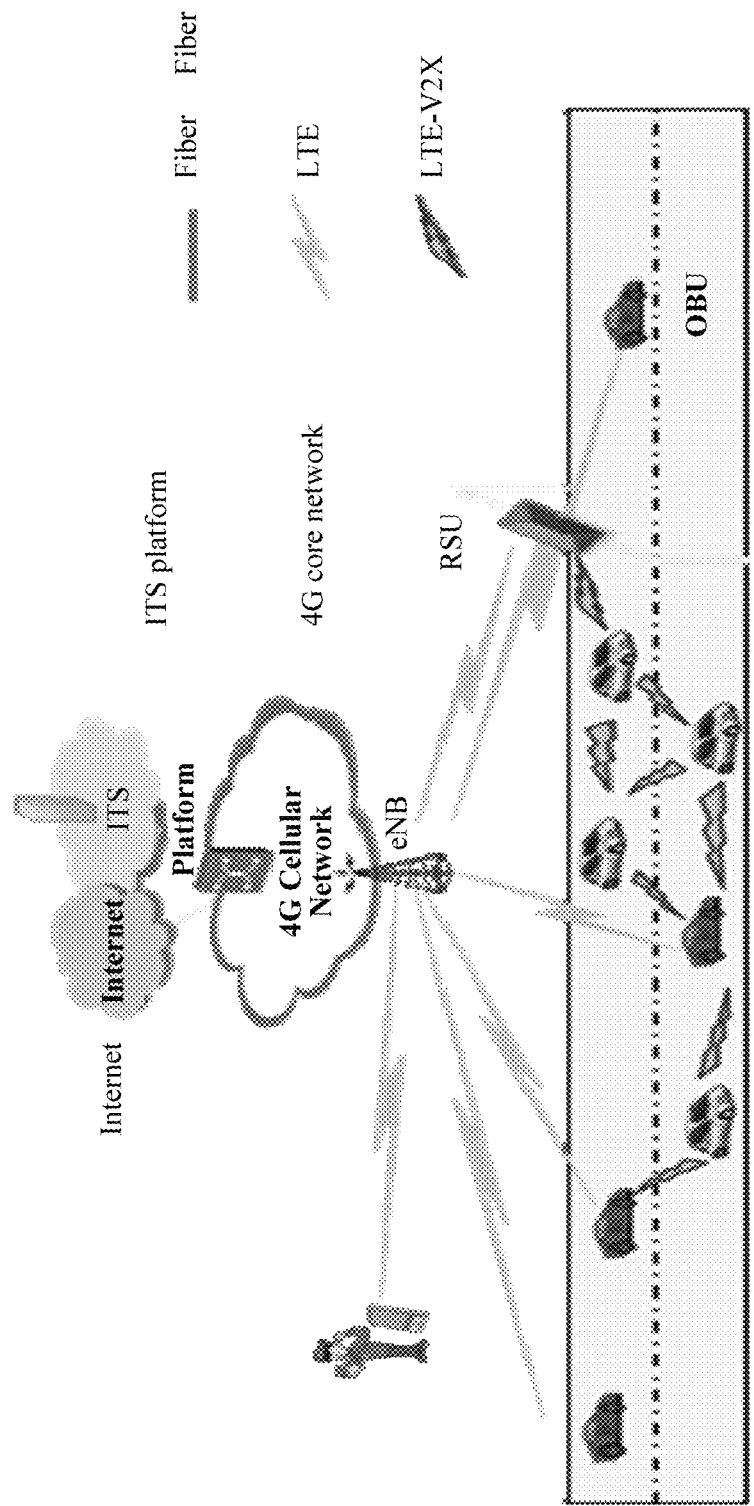
FIG. 2 is a schematic structural diagram of the Internet of Vehicles of an LTE based vehicle and another communications device according to an embodiment of the present disclosure.
Figure 3:
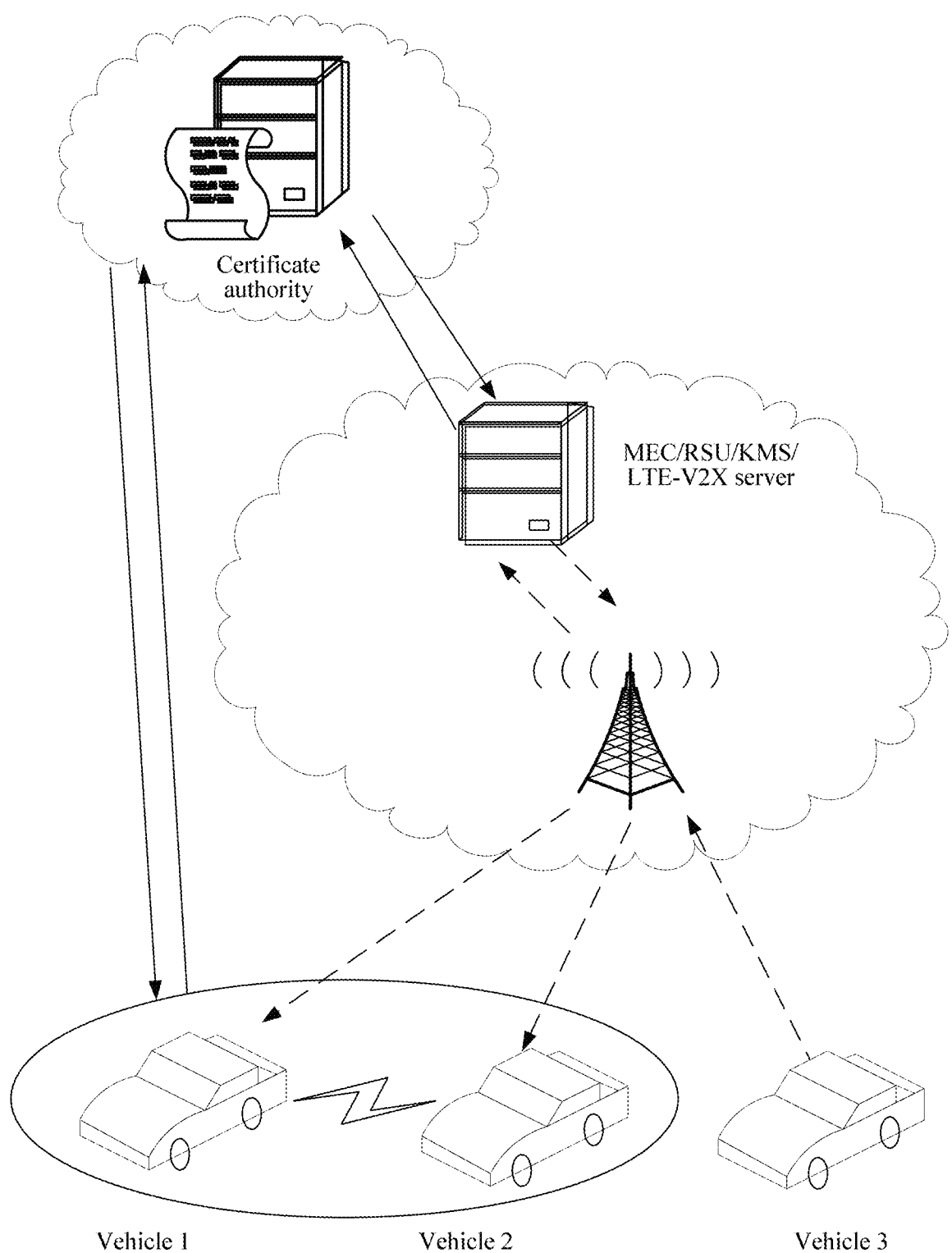
FIG. 3 is a schematic structural diagram of an LTE-V2X communications system according to an embodiment of the present disclosure.

A main application scenario of the embodiments of the present disclosure is an LTE-V2X communications system shown in FIG. 3. The system includes a certificate authority (CA), an eNB, various vehicles, other communications devices (for example, a vehicle 1, a vehicle 2, and a vehicle 3), and a server, for example, a mobile edge computing entity (MEC) or a road side unit (RSU) or a key management servicer (KMS) or an LTE-V2X server. The server may be not within an operator domain.

The CA separately issues a certificate to the server, the vehicle 1, the vehicle 2, and the vehicle 3.

Figure 4:
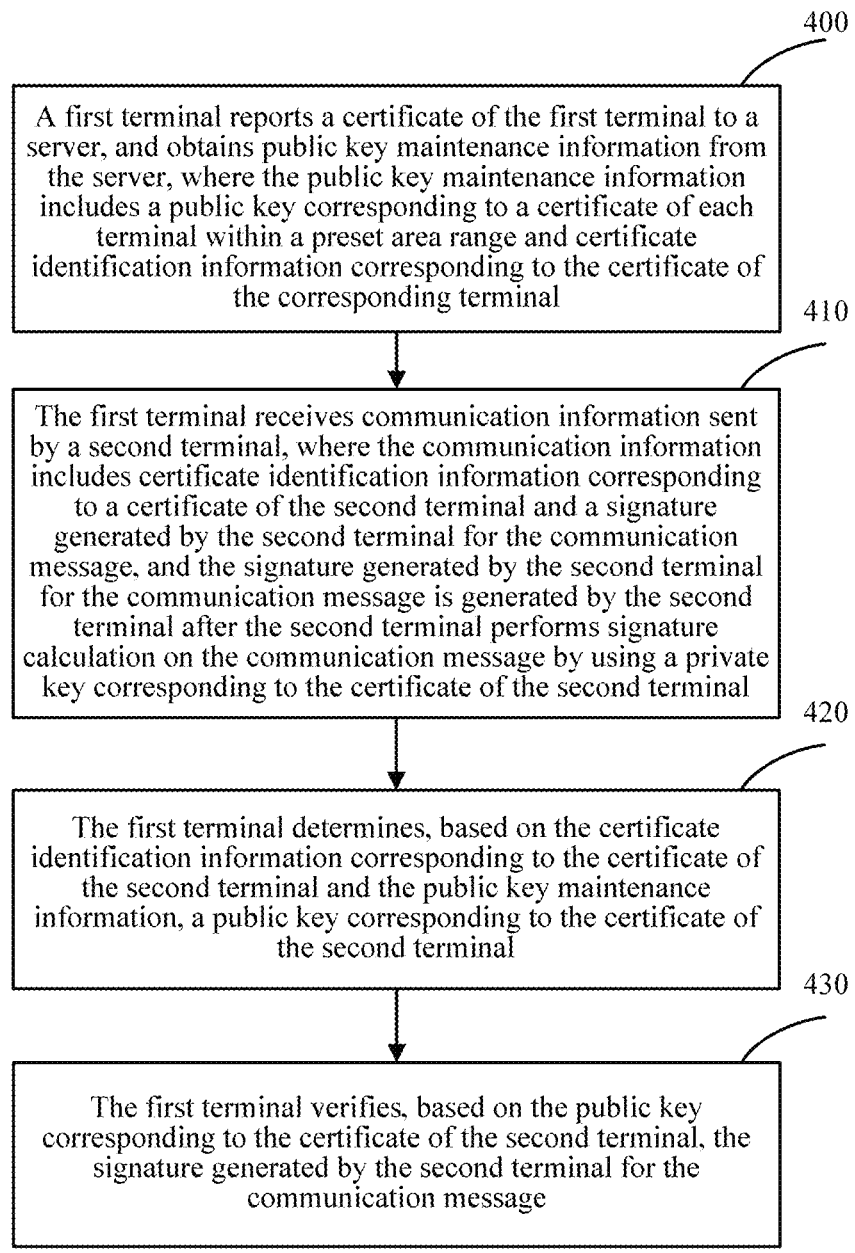
FIG. 4 is a brief flowchart of a certificate notification method on a terminal side according to an embodiment of the present disclosure.

Referring to FIG. 4, an embodiment of the present disclosure provides a certificate notification method, including the following steps.

Step 400: A first terminal reports a certificate of the first terminal to a server, and obtains public key maintenance information from the server, where the public key maintenance information includes a public key corresponding to a certificate of each terminal within a preset area range and certificate identification information corresponding to the certificate of the corresponding terminal.

Optionally, the certificate identification information is a combination of the following at least one piece of information that may include a certificate issuer name and a certificate serial number, or a certificate name, or a certificate unique identifier.

Generally, the certificate identification information is a certificate issuer name and a certificate serial number, and a certificate is uniquely identified by using a certificate issuer name and a certificate serial number.

Step 410: The first terminal receives communication information sent by a second terminal, where the communication information includes certificate identification information corresponding to a certificate of the second terminal and a signature generated by the second terminal for the communication message, and the signature generated by the second terminal for the communication message is generated by the second terminal after the second terminal performs signature calculation on the communication message by using a private key corresponding to the certificate of the second terminal.

Therefore, the first terminal only needs to carry a signature generated by the first terminal for to-be-sent information and certificate identification information corresponding to the certificate of the first terminal, and no longer needs to carry the certificate of the first terminal, thereby greatly reducing transmission overheads.

Compared with a dedicated short range communications technology (DSRC) based certificate scheme, in the solution provided in this embodiment of the present disclosure, security overheads of approximately 117 bytes required for carrying a certificate in an LTE-V2X message on a PC5 interface are saved (a typical value of an LTE-V2X message is 50 to 100 bytes). Therefore, security overheads of a message on the PC5 interface can be significantly reduced, thereby improving a capacity of an LTE-V2X system.

Step 420: The first terminal determines, based on the certificate identification information corresponding to the certificate of the second terminal and the public key maintenance information, a public key corresponding to the certificate of the second terminal.

Step 430: The first terminal verifies, based on the public key corresponding to the certificate of the second terminal, the signature generated by the second terminal for the communication message.

When step 400 is performed, there is no sequence between the process of reporting, by the first terminal, the certificate of the first terminal to the server and the process of obtaining, by the first terminal, the public key maintenance information from the server.

The first terminal may report the certificate of the first terminal to the server in a manner not limited to the following several manners:

First manner: When obtaining geographical location information of the first terminal, the first terminal reports the geographical location information and the certificate of the first terminal to the server.

For example, the first terminal obtains the geographical location information of the first terminal by using a Global Positioning System (GPS) of the first terminal.

The server obtains area configuration information, and when determining, based on the geographical location information reported by the first terminal and the area configuration information, that an area to which the first terminal belongs is changed, updates the public key maintenance information based on a public key corresponding to the certificate of the first terminal and the certificate identification information corresponding to the certificate of the first terminal.

Herein, the area configuration information is a division result obtained by performing area division in a unit of at least one base station, or in a unit of at least one tracking area (TA), or based on a geographical area, and each area corresponds to one area identifier. The area configuration information may be preconfigured by the server, and the area configuration information may be delivered to each terminal in an area managed by the server.

Second manner: When detecting a new cell ECGI, the first terminal reports the new ECGI and the certificate of the first terminal to the server.

The E-UTRAN cell global identifier (ECGI) is used to globally identify one cell, and the ECGI consists of a PLMN identifier and an E-UTRAN cell identifier.

The server obtains area configuration information, and when determining, based on the ECGI reported by the first terminal and the area configuration information, that an area to which the first terminal belongs is changed, updates the public key maintenance information based on the public key corresponding to the certificate of the first terminal and the certificate identification information corresponding to the certificate of the first terminal.

Third manner: When detecting a new tracking area code (TAC), the first terminal reports the new TAC and the certificate of the first terminal to the server.

The server obtains area configuration information, and when determining, based on the TAC reported by the first terminal and the area configuration information, that an area to which the first terminal belongs is changed, updates the public key maintenance information based on the public key corresponding to the certificate of the first terminal and the certificate identification information corresponding to the certificate of the first terminal.

In addition, the first terminal may determine, in advance based on the area configuration information, whether the area to which the first terminal belongs is changed.

Optionally, corresponding to the foregoing three manners, there may also be three manners in which the first terminal determines that the area to which the first terminal belongs is changed:

(1) When obtaining the geographical location information of the first terminal, the first terminal determines, based on the geographical location information and the area configuration information, that the area to which the first terminal belongs is changed.

(2) When detecting the new ECGI, the first terminal determines, based on the new ECGI and the area configuration information, that the area to which the first terminal belongs is changed.

(3) When detecting the new TAC, the first terminal determines, based on the new TAC and the area configuration information, that the area to which the first terminal belongs is changed.

Fourth manner: For the foregoing three manners of determining that the area to which the first terminal belongs is changed or another possible implementation, when determining that the area to which the first terminal belongs is changed, the first terminal sends, to the server, the certificate of the first terminal and an area identifier of the area to which the first terminal belongs.

Optionally, the server updates, based on the public key corresponding to the certificate of the first terminal and the certificate identification information corresponding to the certificate of the first terminal, public key maintenance information corresponding to the area identifier of the area to which the first terminal belongs, or updates public key maintenance information corresponding to the area identifier of the area to which the first terminal belongs and public key maintenance information corresponding to an area identifier of at least one neighboring area of the area to which the first terminal belongs.

Figure 5:
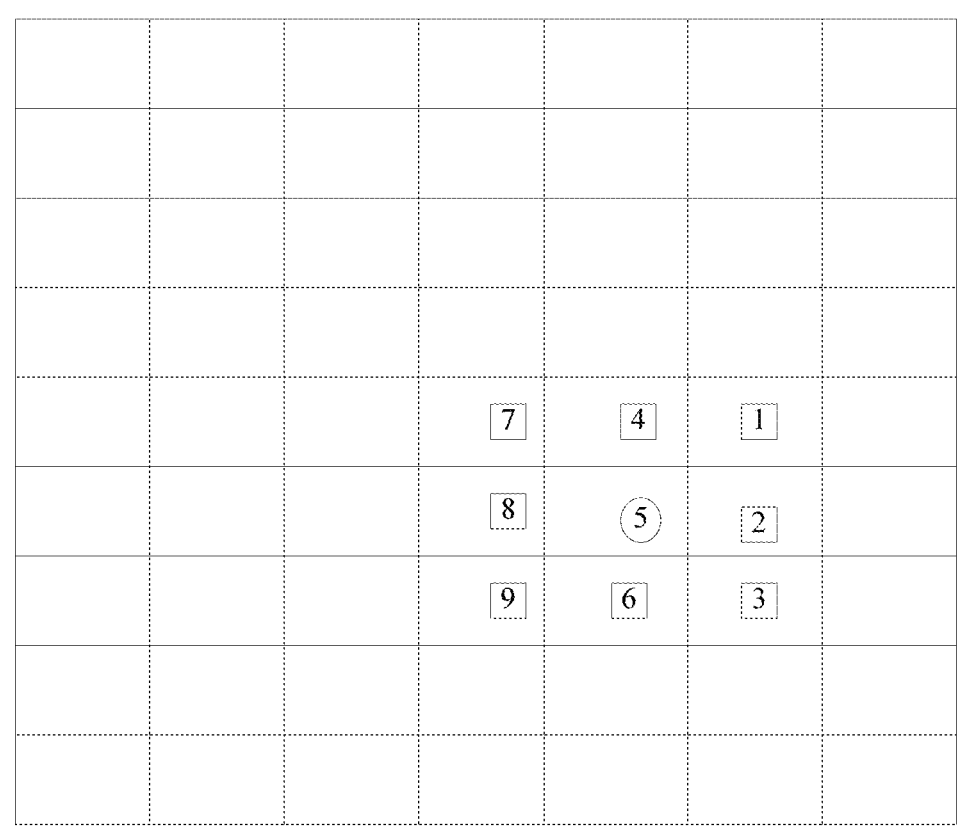

For example, referring to FIG. 5, each rectangle shown in the figure is an area obtained through division in advance, and each rectangle represents one area. Assuming that the first terminal currently belongs to an area 5, public key maintenance information corresponding to the area 5 or public key maintenance information corresponding to each of an area 1 to an area 9 is updated based on the public key corresponding to the certificate of the first terminal and the certificate identification information corresponding to the certificate of the first terminal. In this case, the area 1 to the area 9 (except the area 5) are neighboring areas of the area 5.

Fifth manner: The first terminal determines a certificate that needs to be used after the certificate is updated, and reports, to the server, the certificate that needs to be used after the update.

For example, the first terminal may update the certificate at an interval of 10 minutes.

The server updates the public key maintenance information based on the public key corresponding to the certificate of the first terminal and the certificate identification information corresponding to the certificate of the first terminal.

In addition, for the foregoing five manners in which the first terminal reports the certificate of the first terminal to the server, when the first terminal reports the certificate of the first terminal, a signature generated by the first terminal for the currently reported message needs to be carried.

After receiving the message, the server verifies validity of the certificate and verifies the signature based on the public key included in the certificate of the first terminal, and after the verification succeeds, derives the public key of the first terminal and the certificate identification information based on the certificate of the first terminal, for updating the public key maintenance information.

When performing step 400, the first terminal may obtain the public key maintenance information from the server in a manner not limited to the following several manners:

First manner: The first terminal receives the public key maintenance information sent by the server.

Herein, the public key maintenance information is directly sent by the server to the terminal, and the public key maintenance information may include a public key corresponding to a certificate of each terminal within a range managed by the server and certificate identification information corresponding to the certificate of the corresponding terminal.

Second manner: The first terminal receives a public key maintenance message corresponding to the area identifier of the area to which the first terminal belongs and the area identifier of the area to which the first terminal belongs, where the public key maintenance message and the area identifier are sent by the server.

Herein, the public key maintenance information is directly sent by the server to the terminal, and the public key maintenance information may include a public key corresponding to a certificate of each terminal within the area to which the first terminal belongs and certificate identification information corresponding to the certificate of the corresponding terminal.

Third manner: The first terminal receives the public key maintenance message broadcast by the server.

For example, the server may broadcast the public key maintenance message by using the eNB each time when performing broadcast by using a multimedia broadcast multicast service (MBMS). The public key maintenance message may be a public key corresponding to a certificate of each terminal within a range managed by the server and certificate identification information corresponding to the certificate of the corresponding terminal.

Fourth manner: The first terminal receives a public key maintenance message corresponding to the area identifier of the area to which the first terminal belongs and the area identifier of the area to which the first terminal belongs, where the public key maintenance message and the area identifier are broadcast by the server.

To be specific, the server may broadcast, each time, at least one area identifier and a public key maintenance message corresponding to the corresponding area identifier.

For the foregoing four manners in which the first terminal obtains the public key maintenance information, the first terminal may obtain the public key maintenance information before or after the first terminal reports the certificate of the first terminal, or a combination of at least one of the foregoing four manners may be used. In addition, the message received by the first terminal and including the public key maintenance information and/or the public key maintenance message corresponding to the area identifier of the area to which the first terminal belongs and the area identifier of the area to which the first terminal belongs further needs to carry a certificate of the server and a signature generated by the server for a current notification message (the notification message is sent in a unicast manner or a multicast manner).

After receiving the notification message, the first terminal verifies validity of the certificate of the server, and verifies the signature based on a public key included in the certificate of the server, and after the verification succeeds, stores public key maintenance information and/or the public key maintenance message corresponding to the area identifier of the area to which the first terminal belongs and the area identifier of the area to which the first terminal belongs, where the public key maintenance information and/or the public key maintenance message and the area identifier are carried in the notification message.

Further, after obtaining the public key maintenance information, the first terminal needs to update currently stored public key maintenance information. The first terminal receives a public key maintenance update message. The public key maintenance update message is used to update the public key maintenance information currently stored by the first terminal. The first terminal updates the currently stored public key maintenance information based on the public key maintenance update message.

The public key maintenance update message carries a combination of the following at least one piece of information that may include newest public key maintenance information, or at least one area identifier and a newest public key maintenance message corresponding to the corresponding area identifier, or a public key corresponding to a certificate of a terminal for which a public key in the public key maintenance information is updated within preset duration and certificate identification information corresponding to the certificate of the corresponding terminal, and a public key corresponding to a certificate of a newly added terminal and certificate identification information corresponding to the certificate of the corresponding terminal, or a public key corresponding to a certificate of a terminal for which a public key in public key maintenance information corresponding to each area identifier is updated within preset duration and certificate identification information corresponding to the certificate of the corresponding terminal, a public key corresponding to a certificate of a newly added terminal and certificate identification information corresponding to the certificate of the corresponding terminal, and a corresponding area identifier.

For example, after a terminal 1 obtains public key maintenance information, a terminal 2 and a terminal 3 report certificates that respectively correspond to the terminal 2 and the terminal 3 to the server. The server broadcasts newest public key maintenance information. A public key corresponding to the certificate of the terminal 2 and certificate identification information corresponding to the certificate of the terminal 2, and a public key corresponding to the certificate of the terminal 3 and certificate identification information corresponding to the certificate of the terminal 3 are newly added to the newest public key maintenance information. After receiving the broadcast message, the terminal 1 replaces currently stored public key maintenance information with the newest public key maintenance information.

Alternatively, the server adds, to the broadcast message, only the public key corresponding to the certificate of the terminal 2 and the certificate identification information corresponding to the certificate of the terminal 2, and the public key corresponding to the certificate of the terminal 3 and the certificate identification information corresponding to the certificate of the terminal 3, for broadcasting. After receiving the broadcast message, the terminal 1 updates currently stored public key maintenance information by using the broadcast message.

Figure 6:
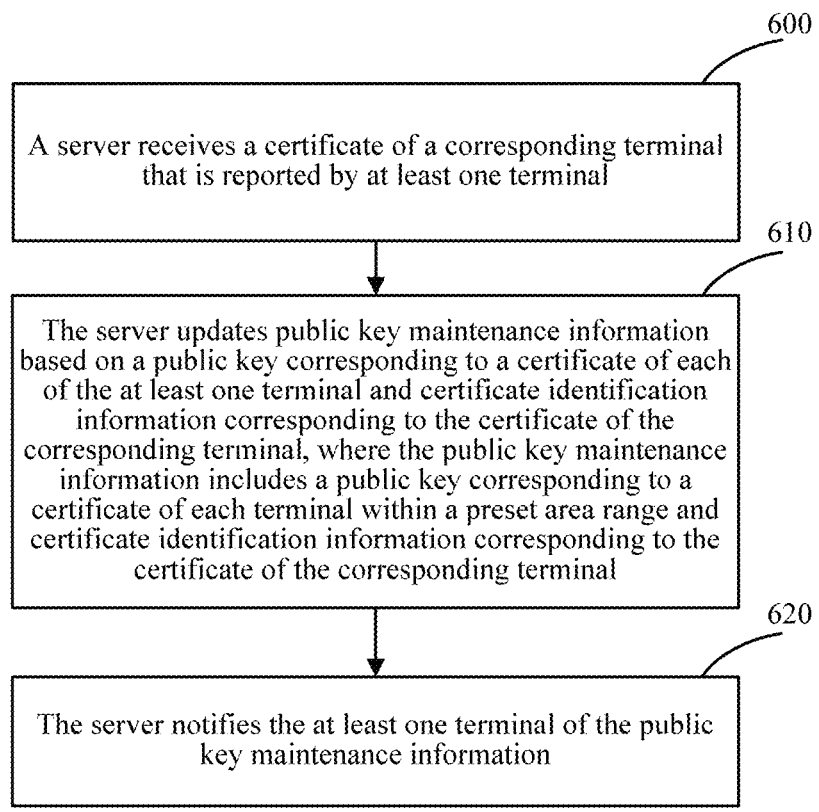
FIG. 6 is a brief flowchart of a certificate notification method on a server side according to an embodiment of the present disclosure.

Referring to FIG. 6, an embodiment of the present disclosure provides a certificate notification method, including the following steps:

Step 600: A server receives a certificate of a corresponding terminal that is reported by at least one terminal.

Step 610: The server updates public key maintenance information based on a public key corresponding to a certificate of each of the at least one terminal and certificate identification information corresponding to the certificate of the corresponding terminal, where the public key maintenance information includes a public key corresponding to a certificate of each terminal within a preset area range and certificate identification information corresponding to the certificate of the corresponding terminal.

Step 620: The server notifies the at least one terminal of the public key maintenance information.

Step 600 and step 620 respectively correspond to that the first terminal reports the certificate of the first terminal to the server and that the first terminal obtains the public key maintenance information from the server in the foregoing descriptions, and details are not described herein again.

When step 610 is performed, a public key corresponding to a certificate of a terminal and certificate identification information corresponding to the certificate of the corresponding terminal are newly added to the public key maintenance information, where the public key and the certificate identification information are newly reported, and when a certificate is periodically updated, information that is in the public key maintenance information and that is originally stored by the corresponding terminal is replaced with a public key corresponding to a newest certificate of the terminal and certificate identification information corresponding to the newest certificate of the corresponding terminal. In addition to that, information that does not need to be stored needs to be deleted from the public key maintenance information. Herein, a manner not limited to the following two manners may be used:

First manner: If the server determines that first public key maintenance information included in a to-be-analyzed public key maintenance information set times out and a public key corresponding to a certificate of a second terminal and certificate identification information corresponding to the certificate of the second terminal are not updated, the server deletes, from the first public key maintenance information, the public key corresponding to the certificate of the second terminal and the certificate identification information corresponding to the certificate of the second terminal.

The to-be-analyzed public key maintenance information set includes at least one piece of public key maintenance information that stores the public key corresponding to the certificate of the second terminal and the certificate identification information corresponding to the certificate of the second terminal, the first public key maintenance information is any piece of public key maintenance information in the to-be-analyzed public key maintenance information set, and the second terminal is any one of the at least one terminal.

Figure 7:
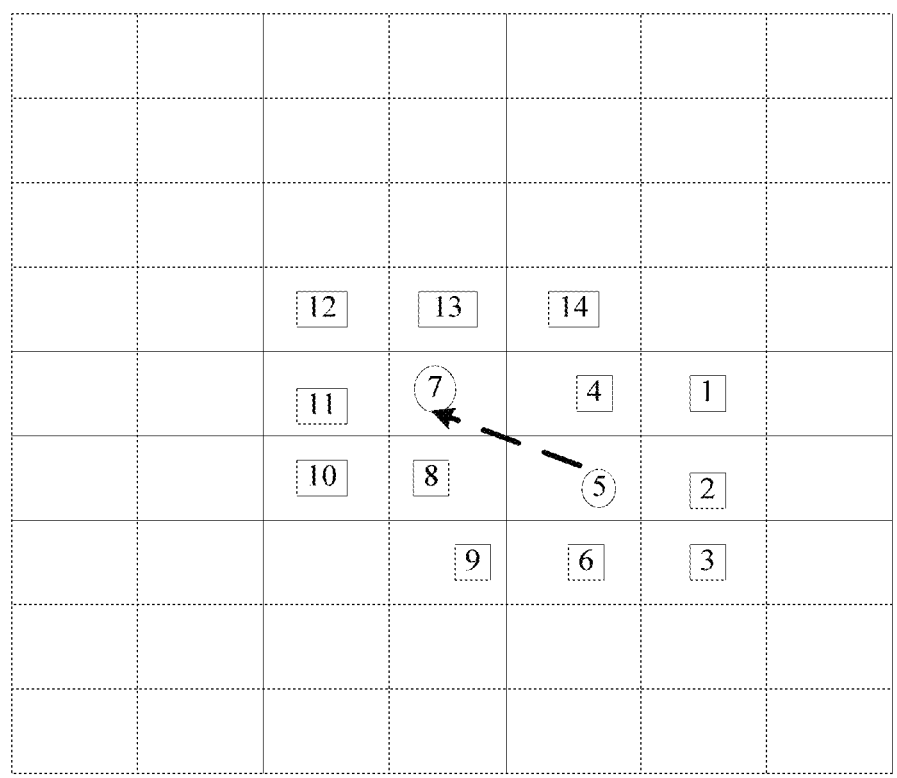
FIG. 7 is a schematic diagram of a change of an area in which a terminal is located according to an embodiment of the present disclosure.

Referring to FIG. 7, when a terminal 1 is located in an area 5, public key maintenance information corresponding to each of an area 1 to an area 9 includes a public key corresponding to a certificate of the terminal 1 and certificate identification information corresponding to the certificate of the terminal 1. A to-be-analyzed public key maintenance information set corresponding to the terminal 1 includes the public key maintenance information corresponding to each of the area 1 to the area 9, and a timer is set for the public key maintenance information corresponding to each area. When the terminal 1 moves from the area 5 to the area 7, the timer for the public key maintenance information corresponding to each of the area 4, the area 5, the area 7, and the area 8 is reset and performs timing again, because the area 4, the area 5, and the area 8 are neighboring areas of the area 7. The timers for the area 1, the area 2, the area 3, the area 6, and the area 9 continue timing. When the timer times out, the public key corresponding to the certificate of the terminal 1 and the certificate identification information corresponding to the certificate of the terminal 1 are still not updated. Therefore, the public key corresponding to the certificate of the terminal 1 and the certificate identification information corresponding to the certificate of the terminal 1 are deleted from the public key maintenance information corresponding to each of the area 1, the area 2, the area 3, the area 6, and the area 9.

A second manner: When determining that a third terminal moves from a first area to a second area, the server determines a first neighboring area set and a second neighboring area set that respectively correspond to the and the second area, where the first neighboring area set includes an area identifier of at least one neighboring area of the first area and an area identifier of the first area, and the second neighboring area set includes an area identifier of at least one neighboring area of the second area and an area identifier of the second area, the server determines an intersection set of the first neighboring area set and the second neighboring area set, and a to-be-cleaned set, where the to-be-cleaned set includes an area identifier included in the first area but not included in the intersection set, and the server deletes, from public key maintenance information corresponding to each area identifier in the to-be-cleaned set, a public key corresponding to a certificate of the third terminal and certificate identification information corresponding to the certificate of the third terminal, where the second terminal is any one of the at least one terminal.

Referring to FIG. 7, when the terminal 1 moves from the area 5 to the area 7, an area set (the area 1, the area 2, the area 3, the area 4, the area 5, the area 6, the area 7, the area 8, and the area 9) corresponding to the area 5, and a neighboring area set (the area 4, the area 5, the area 7, the area 8, an area 10, an area 11, an area 12, an area 13, and an area 14) corresponding to the area 7 are determined, further, it is determined, based on the area set corresponding to the area 5 and the area set corresponding to the area 7, that an intersection set of the two area sets is the area 4, the area 5, the area 7, and the area 8, and areas included in the area set corresponding to the area 5 but not included in the intersection set forms a to-be-cleaned set (the area 1, the area 2, the area 3, the area 6, the area 9). Therefore, the public key corresponding to the certificate of the terminal 1 and the certificate identification information corresponding to the certificate of the terminal 1 are deleted from the public key maintenance information corresponding to each of the area 1, the area 2, the area 3, the area 6, and the area 9.

Figure 8A:
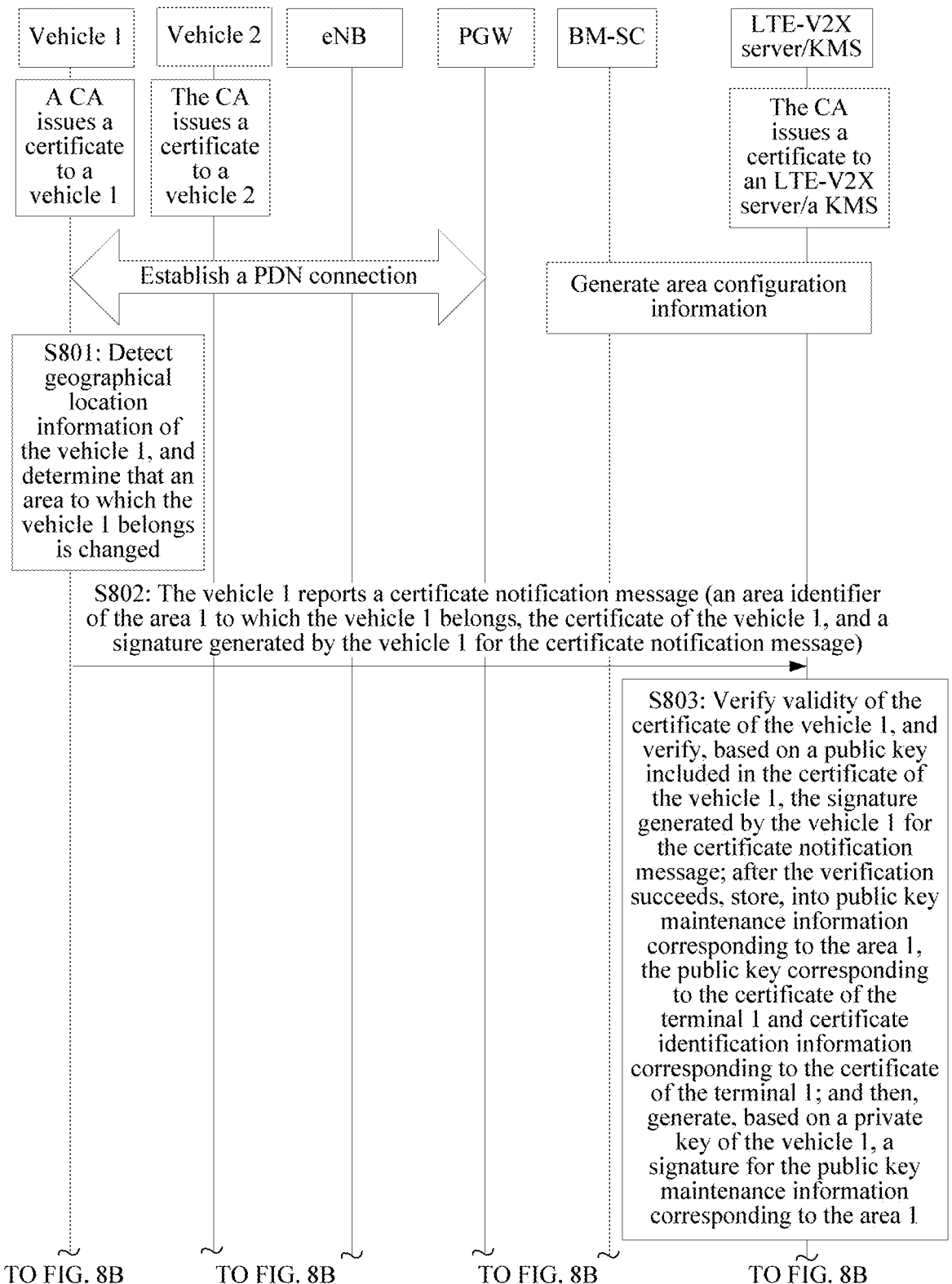
FIG. 8A, FIG. 8B, and FIG. 8C are a first specific flowchart of a certificate notification method according to an embodiment of the present disclosure.
Figure 8B:
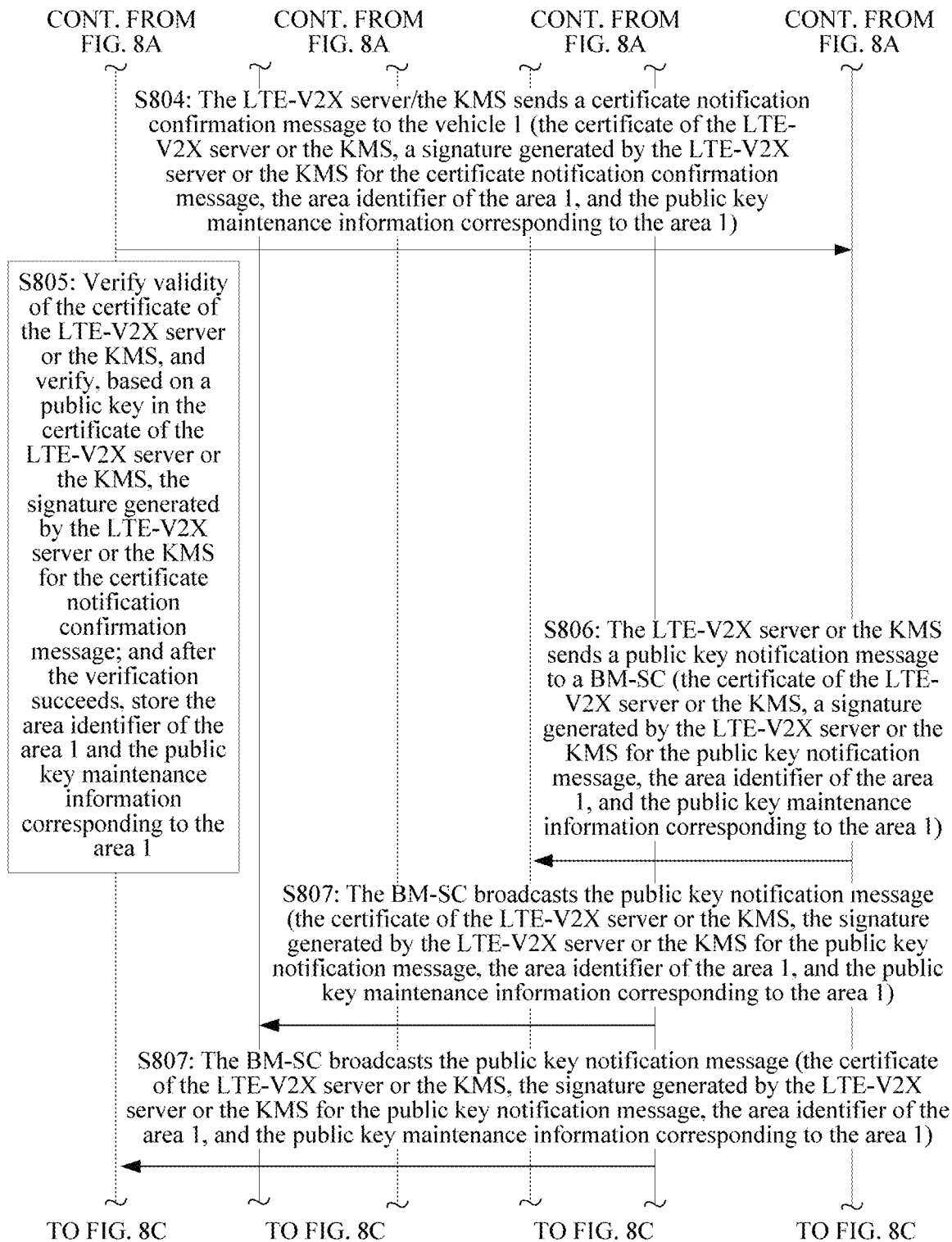
Figure 8C:
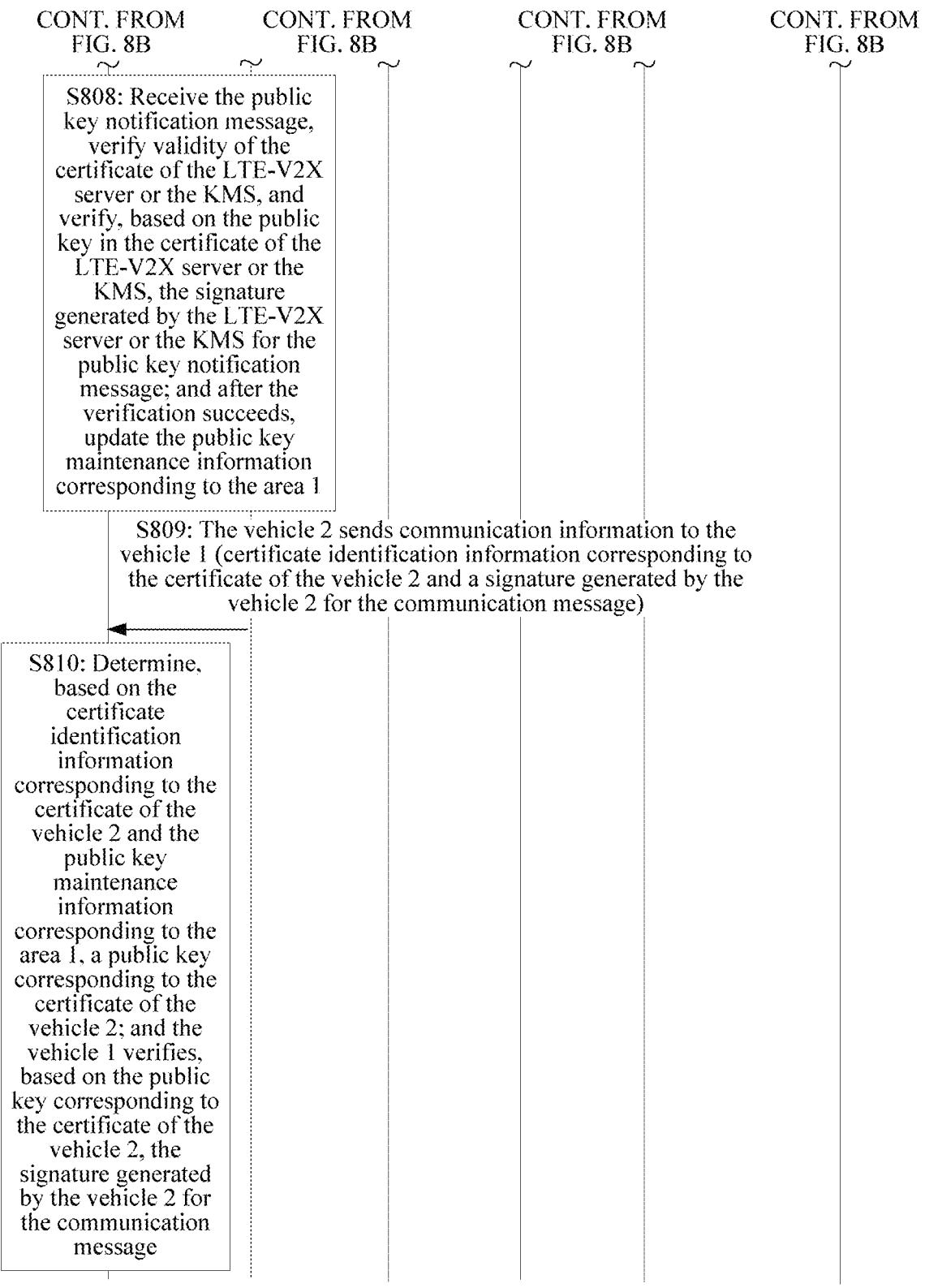

Referring to FIG. 8A, FIG. 8B, and FIG. 8C, an embodiment of the present disclosure provides a certificate notification method. A specific procedure of the method is as follows:

S801: A vehicle 1 detects geographical location information of the vehicle 1, and determines that an area to which the vehicle 1 belongs is changed.

For example, the vehicle 1 moves from an area 2 to an area 1.

Before the vehicle 1 detects the geographical location information of the vehicle 1, and determines that the area to which the vehicle 1 belongs is changed, the following operations further need to be performed.

A CA already separately issues a certificate to the vehicle 1, a vehicle 2, and an LTE-V2X server or a KMS.

The vehicle 1 already successfully establishes a public data network (PDN) connection to a PDN gateway (PGW).

The LTE-V2X server or the KMS divides a V2X area, to obtain an area identifier corresponding to each area, and a correspondence between the area identifier corresponding to each area and a base station identifier of each base station managed by a broadcast/multicast service center (BM-SC), as area configuration information.

S802: The vehicle 1 reports a certificate notification message, where the certificate notification message carries an area identifier of an area 1 to which the vehicle 1 belongs, a certificate of the vehicle 1, and a signature generated by the vehicle 1 for the certificate notification message.

S803: An LTE-V2X server or a KMS verifies validity of the certificate of the vehicle 1, and verifies, based on a public key included in the certificate of the vehicle 1, the signature generated by the vehicle 1 for the certificate notification message, and after the verification succeeds, stores, into public key maintenance information corresponding to the area 1, the public key corresponding to the certificate of the terminal 1 and certificate identification information corresponding to the certificate of the terminal 1.

S804: The LTE-V2X server or the KMS sends a certificate notification confirmation message to the vehicle 1, where the certificate notification confirmation message carries a certificate of the LTE-V2X server or the KMS, a signature generated by the LTE-V2X server or the KMS for the certificate notification confirmation message, the area identifier of the area 1, and the public key maintenance information corresponding to the area 1.

S805: The vehicle 1 verifies validity of the certificate of the LTE-V2X server or the KMS, and verifies, based on a public key in the certificate of the LTE-V2X server or the KMS, the signature generated by the LTE-V2X server or the KMS for the certificate notification confirmation message, and after the verification succeeds, stores the area identifier of the area 1 and the public key maintenance information corresponding to the area 1.

S806: The LTE-V2X server or the KMS sends a public key notification message to a BM-SC, where the public key notification message carries the certificate of the LTE-V2X server or the KMS, a signature generated by the LTE-V2X server or the KMS for the public key notification message, the area identifier of the area 1, and the public key maintenance information corresponding to the area 1.

S807: The BM-SC broadcasts the public key notification message.

S808: The vehicle 1 (a vehicle 2) receives the public key notification message, verifies validity of the certificate of the LTE-V2X server or the KMS, and verifies, based on the public key in the certificate of the LTE-V2X server or the KMS, the signature generated by the LTE-V2X server or the KMS for the public key notification message, and after the verification succeeds, updates the public key maintenance information corresponding to the area 1.

S809: The vehicle 2 sends communication information to the vehicle 1, where the communication information includes certificate identification information corresponding to a certificate of the vehicle 2 and a signature generated by the vehicle 2 for the communication message.

S810: The vehicle 1 determines, based on the certificate identification information corresponding to the certificate of the vehicle 2 and the public key maintenance information corresponding to the area 1, a public key corresponding to the certificate of the vehicle 2, and the vehicle 1 verifies, based on the public key corresponding to the certificate of the vehicle 2, the signature generated by the vehicle 2 for the communication message.

In the foregoing embodiment, the vehicle 1 may obtain the public key maintenance information in two manners, that is, S804 and S805 (the LTE-V2X server or the KMS sends the certificate notification confirmation message to the vehicle 1), and S806 to S808 (the LTE-V2X server or the KMS broadcasts the public key notification message by using the BM-SC). Therefore, S804 and S805 are optional implementations.

Figure 9A:
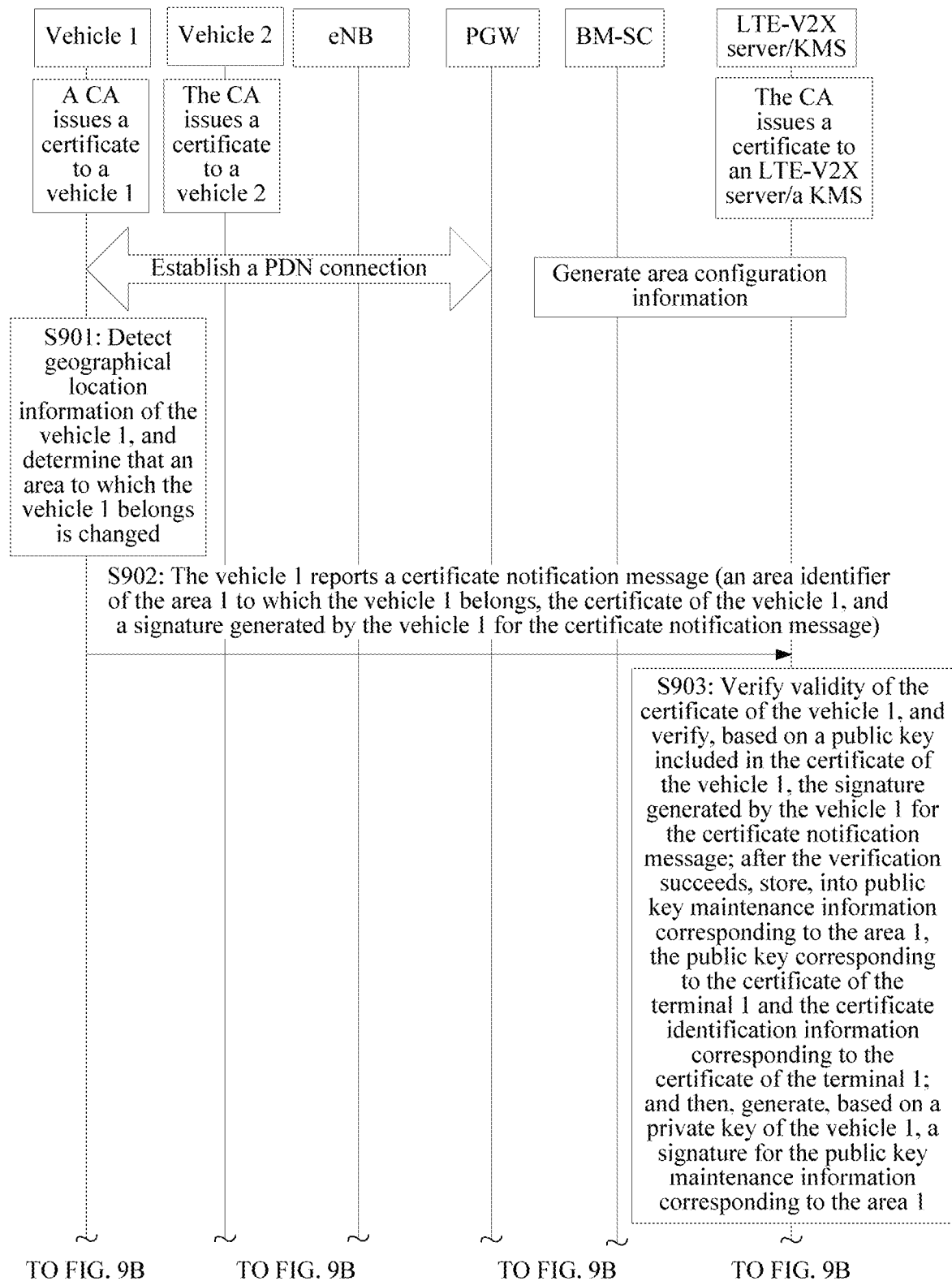
FIG. 9A, FIG. 9B, and FIG. 9C are a second specific flowchart of a certificate notification method according to an embodiment of the present disclosure.
Figure 9B:
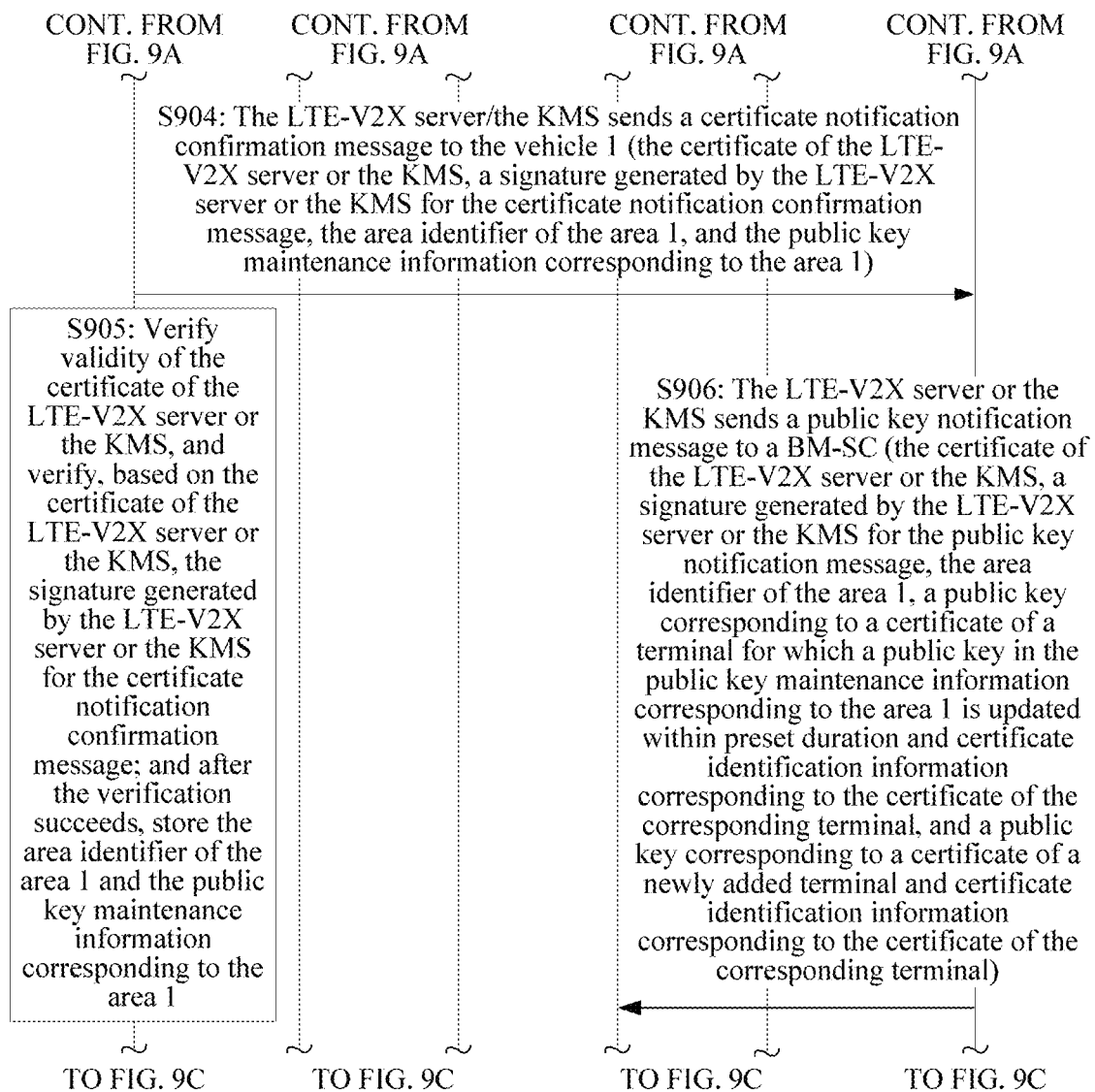
Figure 9C:
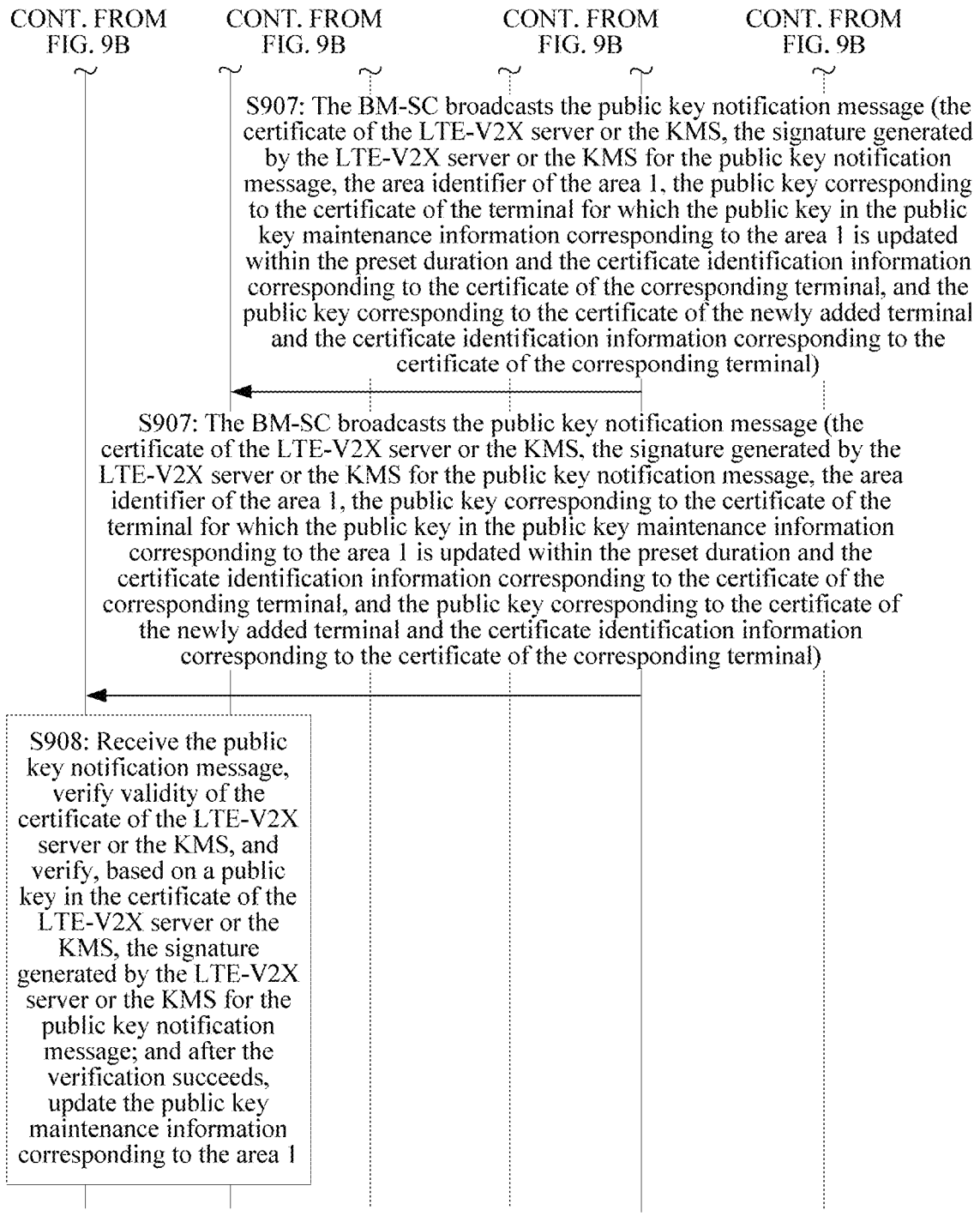

Referring to FIG. 9A, FIG. 9B, and FIG. 9C, an embodiment of the present disclosure provides a certificate notification method. A specific procedure of the method is as follows:

S901 to S905 are the same as S801 to S805 in FIG. 8A, FIG. 8B, and FIG. 8C. In this embodiment, S904 and S905 are steps that need to be performed.

S906: The LTE-V2X server or the KMS sends a public key notification message to a BM-SC, where the public key notification message carries the certificate of the LTE-V2X server or the KMS, a signature generated by the LTE-V2X server or the KMS for the public key notification message, the area identifier of the area 1, a public key corresponding to a certificate of a terminal for which a public key in the public key maintenance information corresponding to the area 1 is updated within preset duration and certificate identification information corresponding to the certificate of the corresponding terminal, and a public key corresponding to a certificate of a newly added terminal and certificate identification information corresponding to the certificate of the corresponding terminal.

S907: The BM-SC broadcasts the public key notification message.

S908: The vehicle 1 (a vehicle 2) receives the public key notification message, verifies validity of the certificate of the LTE-V2X server or the KMS, and verifies, based on the public key in the certificate of the LTE-V2X server or the KMS, the signature generated by the LTE-V2X server or the KMS for the public key notification message, and after the verification succeeds, updates the public key maintenance information corresponding to the area 1.

Figure 10:
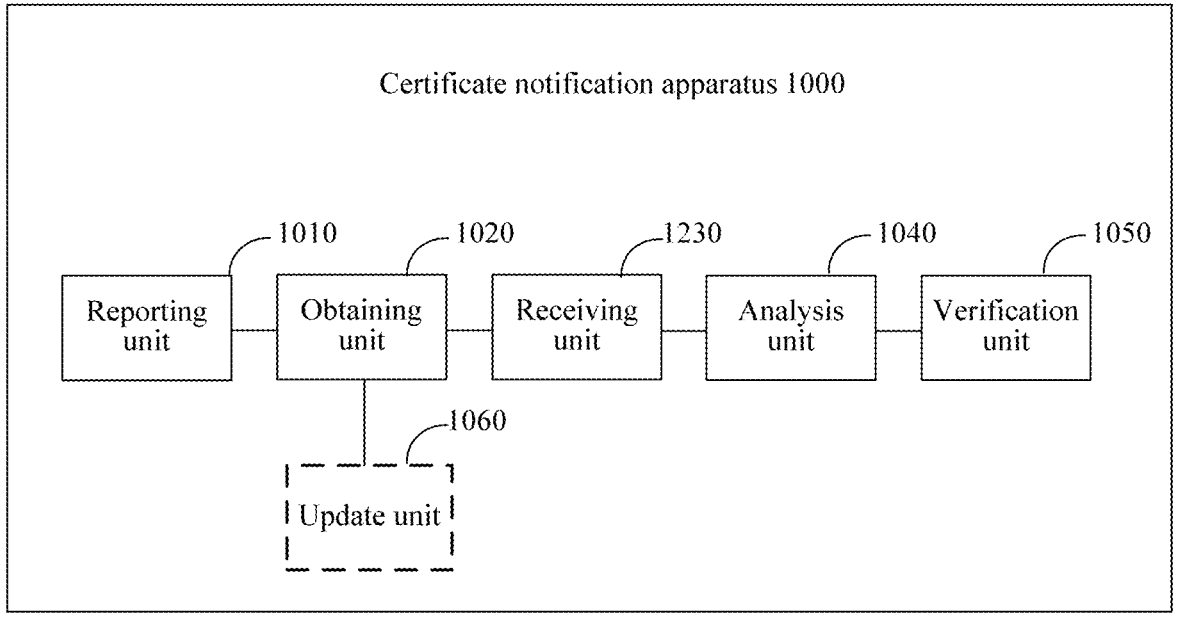
FIG. 10 is a schematic structural diagram of a corresponding certificate notification apparatus on a terminal side according to an embodiment of the present disclosure.

Referring to FIG. 10, an embodiment of the present disclosure provides a certificate notification apparatus moo, including a reporting unit 1010, configured to report a certificate of a first terminal to a server, an obtaining unit 1020, configured to obtain public key maintenance information from the server, where the public key maintenance information includes a public key corresponding to a certificate of each terminal within a preset area range and certificate identification information corresponding to the certificate of the corresponding terminal, a receiving unit 1030, configured to receive communication information sent by a second terminal, where the communication information includes certificate identification information corresponding to a certificate of the second terminal and a signature generated by the second terminal for the communication message, and the signature generated by the second terminal for the communication message is generated by the second terminal after the second terminal performs signature calculation on the communication message by using a private key corresponding to the certificate of the second terminal, an analysis unit 1040, configured to determine, based on the certificate identification information corresponding to the certificate of the second terminal and the public key maintenance information, a public key corresponding to the certificate of the second terminal, and a verification unit 1050, configured to verify, based on the public key corresponding to the certificate of the second terminal, the signature generated by the second terminal for the communication message.

Optionally, the certificate identification information is a combination of the following at least one piece of information that may include a certificate issuer name and a certificate serial number, or a certificate name, or a certificate unique identifier.

Optionally, when reporting the certificate of the first terminal to the server, the reporting unit 1010 is configured to, when the first terminal obtains geographical location information of the first terminal, report the geographical location information and the certificate of the first terminal to the server, or when the first terminal detects a new cell global identifier ECGI, report the new ECGI and the certificate of the first terminal to the server, or when the first terminal detects a new tracking area code TAC, report the new TAC and the certificate of the first terminal to the server.

Optionally, when reporting the certificate of the first terminal to the server, the reporting unit 1010 is configured to: obtain area configuration information, where the area configuration information is a division result obtained by performing area division in a unit of at least one base station, or in a unit of at least one TA, or based on a geographical area, and each area corresponds to one area identifier, and when determining, based on the area configuration information, that an area in which the first terminal is located is changed, send, to the server, the certificate of the first terminal and an area identifier of the area to which the first terminal belongs.

Optionally, when determining, based on the area configuration information, that the area in which the first terminal is located is changed, the reporting unit 1010 is further configured to, when geographical location information of the first terminal is obtained, determine, based on the geographical location information and the area configuration information, that the area to which the first terminal belongs is changed, or when a new ECGI is detected, determine, based on the new ECGI and the area configuration information, that the area to which the first terminal belongs is changed, or when a new TAC is detected, determine, based on the new tracking area code TAC and the area configuration information, that the area to which the first terminal belongs is changed.

Optionally, when reporting the certificate of the first terminal to the server, the reporting unit 1010 is configured to: determine a certificate that needs to be used after the certificate is updated, and report, to the server, the certificate that needs to be used after the update.

Optionally, when obtaining the public key maintenance information from the server, the obtaining unit 1020 is configured to: receive the public key maintenance information sent by the server, or receive a public key maintenance message corresponding to the area identifier of the area to which the first terminal belongs and the area identifier of the area to which the first terminal belongs, where the public key maintenance message and the area identifier are sent by the server.

Optionally, when obtaining the public key maintenance information from the server, the obtaining unit 1020 is configured to: receive the public key maintenance message broadcast by the server, or receive a public key maintenance message corresponding to the area identifier of the area to which the first terminal belongs and the area identifier of the area to which the first terminal belongs, where the public key maintenance message and the area identifier are broadcast by the server.

Optionally, after the public key maintenance information is obtained, the receiving unit 1030 is further configured to: receive, by the first terminal, a public key maintenance update message, where the public key maintenance update message is used to update public key maintenance information currently stored by the first terminal, and the apparatus further includes: an update unit 1060, configured to update the currently stored public key maintenance information based on the public key maintenance update message.

Optionally, the public key maintenance update message carries a combination of the following at least one piece of information that may include newest public key maintenance information, or at least one area identifier and a newest public key maintenance message corresponding to the corresponding area identifier, or a public key corresponding to a certificate of a terminal for which a public key in the public key maintenance information is updated within preset duration and certificate identification information corresponding to the certificate of the corresponding terminal, and a public key corresponding to a certificate of a newly added terminal and certificate identification information corresponding to the certificate of the corresponding terminal, or a public key corresponding to a certificate of a terminal for which a public key in public key maintenance information corresponding to each area identifier is updated within preset duration and certificate identification information corresponding to the certificate of the corresponding terminal, a public key corresponding to a certificate of a newly added terminal and certificate identification information corresponding to the certificate of the corresponding terminal, and a corresponding area identifier.

Figure 11:
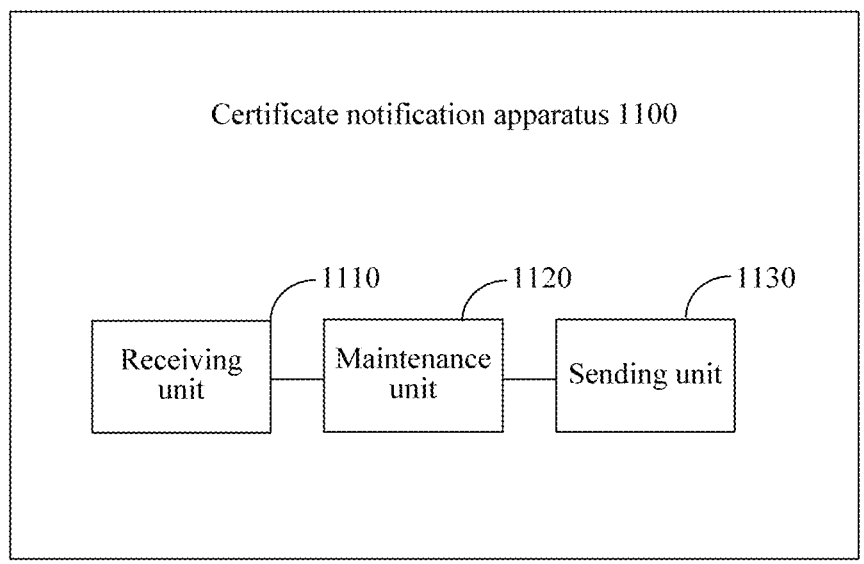
FIG. 11 is a schematic structural diagram of a corresponding certificate notification apparatus on a server side according to an embodiment of the present disclosure.

Referring to FIG. 11, an embodiment of the present disclosure provides a certificate notification apparatus 1100, including: a receiving unit 1110, configured to receive a certificate of a corresponding terminal that is reported by at least one terminal, a maintenance unit 1120, configured to update public key maintenance information based on a public key corresponding to a certificate of each of the at least one terminal and certificate identification information corresponding to the certificate of the corresponding terminal, where the public key maintenance information includes a public key corresponding to a certificate of each terminal within a preset area range and certificate identification information corresponding to the certificate of the corresponding terminal, and a sending unit 1130, configured to notify the at least one terminal of the public key maintenance information.

Optionally, the certificate identification information is a combination of the following at least one piece of information that may include a certificate issuer name and a certificate serial number, or a certificate name, or a certificate unique identifier.

Optionally, when updating the public key maintenance information based on the public key corresponding to the certificate of each of the at least one terminal and the certificate identification information corresponding to the certificate of the corresponding terminal, the maintenance unit 1120 is configured to: when determining that an area to which a first terminal belongs is changed, update, based on a public key corresponding to a certificate of the first terminal and certificate identification information corresponding to the certificate of the first terminal, public key maintenance information corresponding to an area identifier of the area to which the first terminal belongs, or update public key maintenance information corresponding to an area identifier of the area to which the first terminal belongs and public key maintenance information corresponding to an area identifier of at least one neighboring area of the area to which the first terminal belongs, where the first terminal is any one of the at least one terminal.

Optionally, when determining that the area to which the first terminal belongs is changed, the maintenance unit 1120 is further configured to: receive the area identifier that is reported by the first terminal and that is of the area to which the first terminal belongs, or obtain area configuration information, and determine, based on geographical location information reported by the first terminal and the area configuration information, that the area to which the first terminal belongs is changed, or obtain area configuration information, and determine, based on an ECGI reported by the first terminal and the area configuration information, that the area to which the first terminal belongs is changed, or obtain area configuration information, and determine, based on a TAC reported by the first terminal and the area configuration information, that the area to which the first terminal belongs is changed, where the area configuration information is a division result obtained by performing area division in a unit of at least one base station, or in a unit of at least one TA, or based on a geographical area, and each area corresponds to one area identifier.

Optionally, when updating the public key maintenance information based on the public key corresponding to the certificate of each of the at least one terminal and the certificate identification information corresponding to the certificate of the corresponding terminal, the maintenance unit 1120 is further configured to: if determining that first public key maintenance information included in a to-be-analyzed public key maintenance information set times out and a public key corresponding to a certificate of a second terminal and certificate identification information corresponding to the certificate of the second terminal are not updated, delete, by the server from the first public key maintenance information, the public key corresponding to the certificate of the second terminal and the certificate identification information corresponding to the certificate of the second terminal, where the to-be-analyzed public key maintenance information set includes at least one piece of public key maintenance information that stores the public key corresponding to the certificate of the second terminal and the certificate identification information corresponding to the certificate of the second terminal, the first public key maintenance information is any piece of public key maintenance information in the to-be-analyzed public key maintenance information set, and the second terminal is any one of the at least one terminal.

Optionally, when updating the public key maintenance information based on the public key corresponding to the certificate of each of the at least one terminal and the certificate identification information corresponding to the certificate of the corresponding terminal, the maintenance unit 1120 is further configured to: when determining that a third terminal moves from a first area to a second area, determine a first neighboring area set and a second neighboring area set that respectively correspond to the first area and the second area, where the first neighboring area set includes an area identifier of at least one neighboring area of the first area, and the second neighboring area set includes an area identifier of at least one neighboring area of the second area, determine an intersection set of the first neighboring area set and the second neighboring area set, and a to-be-cleaned set, where the to-be-cleaned set includes an area identifier included in the first neighboring area but not included in the intersection set, and delete, from public key maintenance information corresponding to each area identifier in the to-be-cleaned set, a public key corresponding to a certificate of the third terminal and certificate identification information corresponding to the certificate of the third terminal, where the second terminal is any one of the at least one terminal.

Optionally, when notifying the at least one terminal of the public key maintenance information, the sending unit 1130 is configured to: send the public key maintenance information to each of the at least one terminal, or send, to the corresponding terminal, public key maintenance information corresponding to an area identifier of an area to which each of the at least one terminal belongs and the area identifier of the area to which the corresponding terminal belongs.

Optionally, when notifying the at least one terminal of the public key maintenance information, the sending unit 1130 is configured to: broadcast the public key maintenance message, or broadcast at least one area identifier and a public key maintenance message corresponding to the corresponding area identifier.

Optionally, after notifying the at least one terminal of the public key maintenance information, the sending unit 1130 is further configured to: determine and broadcast a public key maintenance update message, where the public key maintenance update message is used to update public key maintenance information currently stored by each of the at least one terminal.

Optionally, the public key maintenance update message carries a combination of the following at least one piece of information that may include newest public key maintenance information, or at least one area identifier and a newest public key maintenance message corresponding to the corresponding area identifier, or a public key corresponding to a certificate of a terminal for which a public key in the public key maintenance information is updated within preset duration and certificate identification information corresponding to the certificate of the corresponding terminal, and a public key corresponding to a certificate of a newly added terminal and certificate identification information corresponding to the certificate of the corresponding terminal, or a public key corresponding to a certificate of a terminal for which a public key in public key maintenance information corresponding to each area identifier is updated within preset duration and certificate identification information corresponding to the certificate of the corresponding terminal, a public key corresponding to a certificate of a newly added terminal and certificate identification information corresponding to the certificate of the corresponding terminal, and a corresponding area identifier.

It should be noted that, division of modules in the embodiments of the present disclosure is an example, and is merely logical function division and may be other division during actual implementation. In addition, the functional modules in the embodiments of this application may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional unit and sold or used as an independent product, the integrated module may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 12:
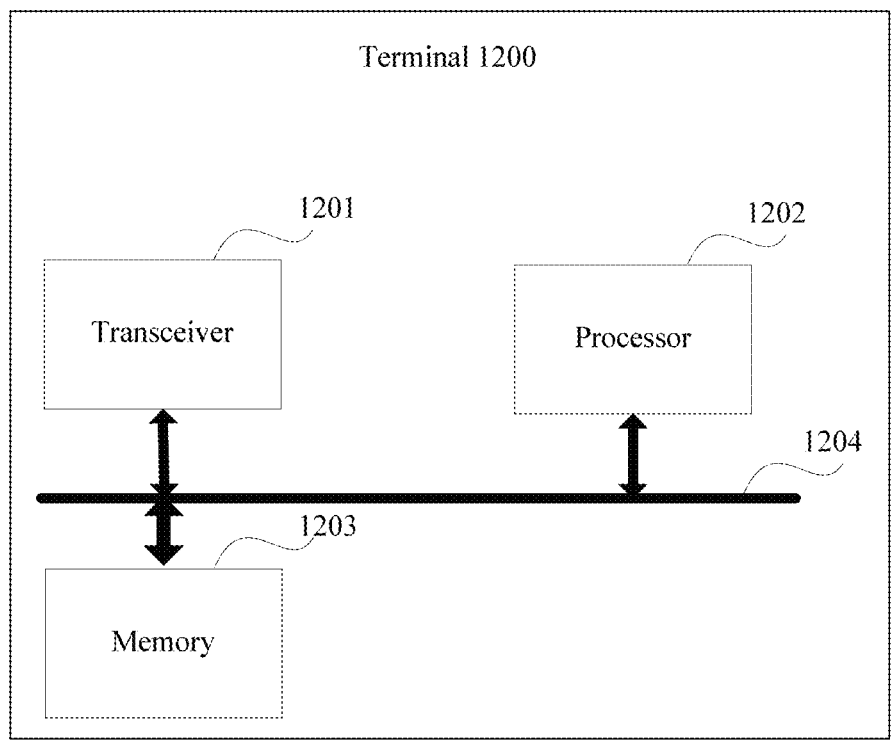
FIG. 12 is a schematic structural diagram of a terminal according to an embodiment of the present disclosure.

Referring to FIG. 12, an embodiment of the present disclosure provides a terminal 1200, including a transceiver 1201, a processor 1202, and a memory 1203. The transceiver 1201, the processor 1202, and the memory 1203 are connected by using a bus 1204.

The transceiver 1201 is configured to: report a certificate of a first terminal to a server, and obtain public key maintenance information from the server, and receive communication information sent by a second terminal, where the communication information includes certificate identification information corresponding to a certificate of the second terminal and a signature generated by the second terminal for the communication message, and the signature generated by the second terminal for the communication message is generated by the second terminal after the second terminal performs signature calculation on the communication message by using a private key corresponding to the certificate of the second terminal.

The memory 1203 is configured to store program code executable by the processor 1202.

The processor 1202 is configured to perform the following operations by using the program code in the memory 1203, which may include determining, based on the certificate identification information corresponding to the certificate of the second terminal and the public key maintenance information, a public key corresponding to the certificate of the second terminal, and verifying, based on the public key corresponding to the certificate of the second terminal, the signature generated by the second terminal for the communication message.

Figure 13:
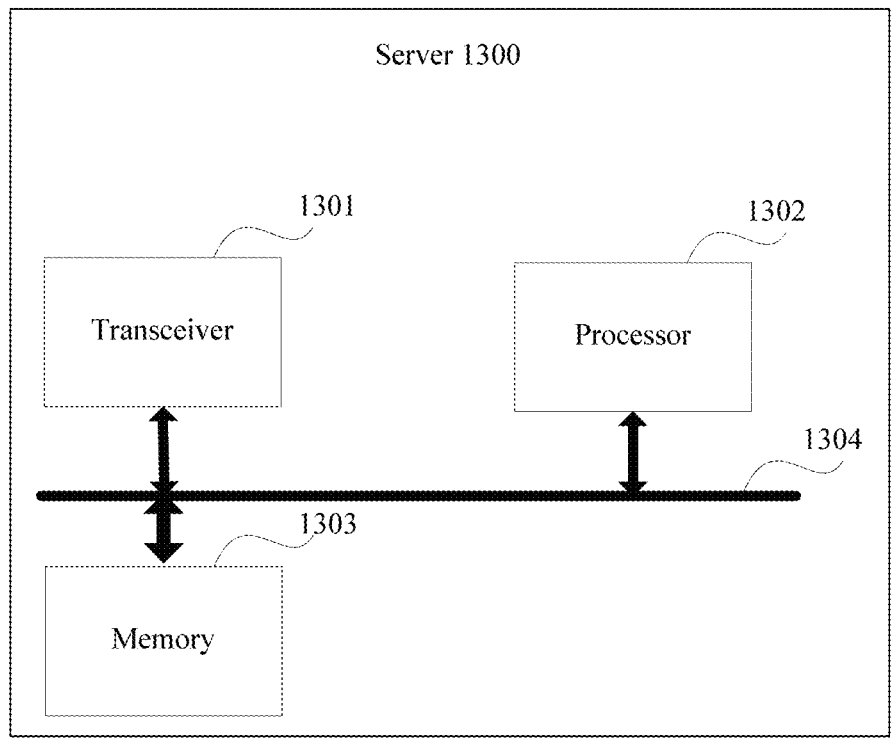
FIG. 13 is a schematic structural diagram of a server according to an embodiment of the present disclosure.

Referring to FIG. 13, an embodiment of the present disclosure provides a server 1300, including a transceiver 1301, a processor 1302, and a memory 1303. The transceiver 1301, the processor 1302, and the memory 1303 are connected by using a bus 1304.

The transceiver 1301 is configured to: receive a certificate of a corresponding terminal that is reported by at least one terminal, and notify the at least one terminal of public key maintenance information.

The memory 1303 is configured to store program code executable by the processor 1302.

The processor 1302 is configured to perform the following operations by using the program code in the memory 1303: updating public key maintenance information based on a public key corresponding to a certificate of each of the at least one terminal and certificate identification information corresponding to the certificate of the corresponding terminal, where the public key maintenance information includes a public key corresponding to a certificate of each terminal within a preset area range and certificate identification information corresponding to the certificate of the corresponding terminal.

In the embodiments of the present disclosure, the bus 1204 and the bus 1304 are respectively represented in FIG. 12 and FIG. 13 by using bold lines. Connection manners between other components are merely for illustration purposes, and are not limited thereto. The bus 1204 and the bus 1304 each may be classified into an address bus, a data bus, a control bus, and the like. For ease of representation, the buses each are represented by using only one bold line in FIG. 12 and FIG. 13, but this does not mean that there is only one bus or only one type of bus.

The reporting unit, the obtaining unit 1020, and the receiving unit 1030 in FIG. 10 may be implemented by using the transceiver 1201 in the terminal 1200, and the analysis unit 1040 and the verification unit 1050 in FIG. 10 may be implemented by using the processor 1202 in the terminal. The receiving unit 1110 and the sending unit 1130 in FIG. 11 may be implemented by using the transceiver 1301 in the server 1300, and the maintenance unit 1120 in FIG. 11 may be implemented by using the processor 1302.

In the embodiments of the present disclosure, the memory 1203 and the memory 1303 are respectively configured to store program code executable by the processor 1202 and the processor 1302, and each may be a volatile memory, for example, a random access memory (RAM), or the memory 1203 and the memory 1303 each may be a non-volatile memory, for example, a read-only memory (ROM), a flash memory, a hard disk drive (HDD), or a solid-state drive (SSD), or the memory 1203 and the memory 1303 each are any other medium that can carry or store expected program code in a form of an instruction or a data structure and can be accessed by a computer, but are not limited thereto. The memory 1203 and the memory 1303 each may be a combination of the foregoing memories.

In the embodiments of the present disclosure, the processor 1202 and the processor 1302 each may be a central processing unit (CPU).

According to the embodiments of the present disclosure, the certificate of the first terminal is reported to the server, and the public key maintenance information is obtained from the server, so that before communicating with another terminal, the first terminal obtains the public key maintenance information in time, the first terminal receives the communication information sent by the second terminal, where the communication information includes the certificate identification information corresponding to the certificate of the second terminal and the signature generated by the second terminal for the communication message, in this case, the communication message no longer needs to carry the certificate of the first terminal, thereby greatly reducing transmission overheads, the first terminal determines, based on the certificate identification information corresponding to the certificate of the second terminal and the public key maintenance information, the public key corresponding to the certificate of the second terminal, and the first terminal verifies, based on the public key corresponding to the certificate of the second terminal, the signature generated by the second terminal for the communication message. The server receives the certificate of the corresponding terminal that is reported by the at least one terminal, and the server updates the public key maintenance information based on the public key corresponding to the certificate of each of the at least one terminal and the certificate identification information corresponding to the certificate of the corresponding terminal; and the server notifies the at least one terminal of the public key maintenance information, so that each terminal can obtain the public key maintenance information, thereby ensuring communication between the terminals, and effectively reducing transmission overheads for communication between the terminals.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A certificate notification method, comprising:
    reporting, by a first vehicle, a certificate of the first vehicle to a server, wherein the reporting the certificate of the first vehicle to the server comprises:
    obtaining, by the first vehicle, area configuration information, wherein the area configuration information is a division result obtained by performing area division of an area that is at least one of a unit of at least one base station, a unit of at least one tracking area (TA), or according to a geographical area, and wherein each area corresponds to one area identifier; and
    sending, by the first vehicle to the server, the certificate of the first vehicle and an area identifier of the area to which the first vehicle belongs in response to determining, according to the area configuration information, that an area in which the first vehicle is located is changed, wherein the determining that the area in which the first vehicle is located is changed comprises performing at least one of:
        determining, by the first vehicle, in response to obtaining geographical location information of the first vehicle, and according to the geographical location information and the area configuration information, that the area to which the first vehicle belongs is changed;
        determining, by the first vehicle, in response to detecting a new cell global identifier (ECGI), and according to the new ECGI and the area configuration information, that the area to which the first vehicle belongs is changed; or
        determining, by the first vehicle, in response to detecting a new tracking area code (TAC), and according to the new TAC and the area configuration information, that the area to which the first vehicle belongs is changed;
    obtaining public key maintenance information from the server by the first vehicle, wherein the public key maintenance information comprises a public key corresponding to a certificate of each of one or more vehicles within a preset area range and further comprises certificate identification information corresponding to the certificate of the corresponding vehicle of the one or more vehicles;
    receiving, by the first vehicle, a communication message sent by a second vehicle of the one or more vehicles, wherein the communication message comprises certificate identification information corresponding to a certificate of the second vehicle and a signature generated by the second vehicle for the communication message after the second vehicle performs signature calculation on the communication message using a private key corresponding to the certificate of the second vehicle;
    determining, by the first vehicle, according to certificate identification information corresponding to the certificate of the second vehicle and further according to the public key maintenance information, a public key corresponding to the certificate of the second vehicle; and
    verifying, by the first vehicle, according to the public key corresponding to the certificate of the second vehicle, the signature generated by the second vehicle.

2. The method according to claim 1, wherein the certificate identification information comprises at least one of a certificate issuer name and a certificate serial number, or a certificate name, or a certificate unique identifier.

3. The method according to claim 1, wherein the reporting the certificate of the first vehicle to the server comprises performing at least one of:
    reporting, by the first vehicle, in response to obtaining geographical location information of the first vehicle, the geographical location information and the certificate of the first vehicle to the server; or
    reporting, by the first vehicle, in response to detecting a new cell global identifier (ECGI), the new ECGI and the certificate of the first vehicle to the server; or
    reporting, by the first vehicle, in response to detecting a new tracking area code (TAC), the new TAC and the certificate of the first vehicle to the server.

4. The method according to claim 1, wherein the reporting the certificate of the first vehicle to the server comprises:
    determining, by the first vehicle, a second certificate that needs to be used after the certificate of the first vehicle is updated; and
    reporting, to the server, the second certificate that needs to be used after the certificate of the first vehicle is updated.

5. The method according to claim 1, wherein the obtaining the public key maintenance information comprises performing at least one of:

receiving, by the first vehicle, the public key maintenance information sent by the server; or receiving, by the first vehicle, public key maintenance information corresponding to an area identifier of the area to which the first vehicle belongs and the area identifier of the area to which the first vehicle belongs, wherein the public key maintenance information and the area identifier are sent by the server.

6. The method according to claim 1, wherein the obtaining the public key maintenance information comprises performing at least one of:

receiving, by the first vehicle, the public key maintenance information broadcast by the server; or receiving, by the first vehicle, public key maintenance information corresponding to the area identifier of the area to which the first vehicle belongs and the area identifier of the area to which the first vehicle belongs, wherein the public key maintenance information and the area identifier are broadcast by the server.

7. The method according to claim 1, further comprising performing, after the obtaining the public key maintenance information:

receiving, by the first vehicle, a public key maintenance update message, wherein the public key maintenance update message is used to update public key maintenance information currently stored by the first vehicle; and updating, by the first vehicle, the currently stored public key maintenance information according to the public key maintenance update message.

8. A non-transitory computer readable storage medium storing a program to be executed by a processor, the program including instructions to:

report a certificate of a first vehicle to a server, wherein the instructions to report the certificate of the first vehicle to the server include instructions to:

obtain area configuration information, wherein the area configuration information is a division result obtained by performing area division of an area that is at least one of a unit of at least one base station, a unit of at least one tracking area (TA), or according to a geographical area, and wherein each area corresponds to one area identifier; and send, to the server, the certificate of the first vehicle and an area identifier of the area to which the first vehicle belongs in response to determining, according to the area configuration information, that an area in which the first vehicle is located is changed, wherein the determining that the area in which the first vehicle is located is changed comprises performing at least one of:

determining, in response to obtaining geographical location information of the first vehicle, and according to the geographical location information and the area configuration information, that the area to which the first vehicle belongs is changed;

determining, in response to detecting a new cell global identifier (ECGI), and according to the new ECGI and the area configuration information, that the area to which the first vehicle belongs is changed; or determining, in response to detecting a new tracking area code (TAC), and according to the new TAC and the area configuration information, that the area to which the first vehicle belongs is changed;

obtain public key maintenance information from the server, wherein the public key maintenance information comprises a public key corresponding to a certificate of each of one or more vehicles within a preset area range and further comprises certificate identification information corresponding to the certificate of the corresponding vehicle of the one or more vehicles;

receive a communication message sent by a second vehicle of the one or more vehicles, wherein the communication message comprises certificate identification information corresponding to a certificate of the second vehicle and a signature generated by the second vehicle for the communication message after the second vehicle performs signature calculation on the communication message using a private key corresponding to the certificate of the second vehicle;

determine, according to certificate identification information corresponding to the certificate of the second vehicle and further according to the public key maintenance information, a public key corresponding to the certificate of the second vehicle; and verify, according to the public key corresponding to the certificate of the second vehicle, the signature generated by the second vehicle.

9. A certificate notification apparatus, comprising:

a transceiver;

a processor; and a non-transitory computer-readable storage medium storing a program to be executed by the processor, the program including instructions to:

cause the transceiver to report a certificate of a first vehicle to a server, wherein the instructions to cause the transceiver to report the certificate of the first vehicle to the server include instructions to:

obtain area configuration information, wherein the area configuration information is a division result obtained by performing area division of an area that is at least one of a unit of at least one base station, a unit of at least one tracking area (TA), or according to a geographical area, and wherein each area corresponds to one area identifier; and cause the transceiver to send, to the server, the certificate of the first vehicle and an area identifier of the area to which the first vehicle belongs in response to determining, according to the area configuration information, that an area in which the first vehicle is located is changed, wherein the determining that the area in which the first vehicle is located is changed comprises performing at least one of:

determining, in response to obtaining geographical location information of the first vehicle, and according to the geographical location information and the area configuration information, that the area to which the first vehicle belongs is changed;

determining, in response to detecting a new cell global identifier (ECGI), and according to the new ECGI and the area configuration information, that the area to which the first vehicle belongs is changed; or determining, in response to detecting a new tracking area code (TAC), and according to the new TAC and the area configuration information, that the area to which the first vehicle belongs is changed;

cause the transceiver to obtain public key maintenance information from the server, wherein the public key maintenance information comprises a public key corresponding to a certificate of each of one or more vehicles within a preset area range and further comprises certificate identification information corresponding to the certificate of the corresponding vehicle of the one or more vehicles;

receive, through the transceiver, a communication message sent by a second vehicle of the one or more vehicles, wherein the communication message comprises certificate identification information corresponding to a certificate of the second vehicle and a signature generated by the second vehicle for the communication message after the second vehicle performs signature calculation on the communication message using a private key corresponding to the certificate of the second vehicle;

determine, according to certificate identification information corresponding to the certificate of the second vehicle and further according to the public key maintenance information, a public key corresponding to the certificate of the second vehicle; and verify, according to the public key corresponding to the certificate of the second vehicle, the signature generated by the second vehicle.

10. The apparatus according to claim 9, wherein the certificate identification information comprises at least one of a certificate issuer name and a certificate serial number, or a certificate name, or a certificate unique identifier.

11. The apparatus according to claim 9, wherein the instructions to cause the transceiver to report the certificate of the first vehicle to the server comprise instructions to perform at least one of:
report, in response to obtaining geographical location information of the first vehicle, the geographical location information and the certificate of the first vehicle to the server; or
report, in response to detecting a new cell global identifier (ECGI), the new ECGI and the certificate of the first vehicle to the server; or
report, in response to detecting a new tracking area code (TAC), the new TAC and the certificate of the first vehicle to the server.

12. The apparatus according to claim 9, wherein the instructions to cause the transceiver to report the certificate of the first vehicle to the server comprise instructions to:
determine, by the first vehicle, a second certificate that needs to be used after the certificate of the first vehicle is updated; and
report, to the server, the second certificate that needs to be used after the certificate of the first vehicle is updated.

13. The apparatus according to claim 9, wherein the instructions to obtain the public key maintenance information from the server include instructions to:
receive, through the transceiver, the public key maintenance information sent by the server; or
receive a public key maintenance information corresponding to an area identifier of the area to which the first vehicle belongs and an identifier of the area to which the first vehicle belongs, wherein the public key maintenance information and the area identifier are sent by the server.

14. The apparatus according to claim 9, wherein the instructions to cause the transceiver to obtain public key maintenance information from the server comprise instructions to perform at least one of:
receive the public key maintenance information broadcast by the server; or
receive public key maintenance information corresponding to an area identifier of the area to which the first vehicle belongs and the area identifier of the area to which the first vehicle belongs, wherein the public key maintenance information and the area identifier are broadcast by the server.

15. The apparatus according to claim 9, wherein the program further includes instructions to, after obtaining the public key maintenance information:
receive, through the transceiver, a public key maintenance update message, wherein the public key maintenance update message is used to update public key maintenance information currently stored by the first vehicle; and
update the currently stored public key maintenance information according to the public key maintenance update message.

16. The apparatus according to claim 15, wherein the public key maintenance update message carries at least one of:
newest public key maintenance information; or
at least one area identifier and a newest public key maintenance information corresponding to the corresponding area identifier; or
a public key corresponding to a certificate of a vehicle for which a public key in the public key maintenance information is updated within a preset duration and certificate identification information corresponding to the certificate of the corresponding vehicle, and a public key corresponding to a certificate of a newly added vehicle and certificate identification information corresponding to the certificate of the corresponding vehicle; or
a public key corresponding to a certificate of a vehicle for which a public key in public key maintenance information corresponding to each area identifier is updated within preset duration and certificate identification information corresponding to the certificate of the corresponding vehicle, a public key corresponding to a certificate of a newly added vehicle and certificate identification information corresponding to the certificate of the corresponding vehicle, and a corresponding area identifier.

* * * * *